US010824665B2

(12) United States Patent
Belavy et al.

(10) Patent No.: US 10,824,665 B2
(45) Date of Patent: Nov. 3, 2020

(54) SYSTEM AND METHOD FOR IMPROVED NAVIGATION OF AVAILABLE CHOICES

(71) Applicant: NBCUniversal Media, LLC, New York, NY (US)

(72) Inventors: Stefan Belavy, Oakland, CA (US); Amir-Pilo Al-Shreideh, San Jose, CA (US); Gajanan Lonkar, Fremont, CA (US); Ping-Hsien Lin, Milpitas, CA (US); Vikas Deshpande, Fremont, CA (US); Gouri Deshpande, Sunnyvale, CA (US)

(73) Assignee: NBCUniversal Media, LLC, New York, NY (US)

( * ) Notice: Subject to any disclaimer, the term of this patent is extended or adjusted under 35 U.S.C. 154(b) by 220 days.

(21) Appl. No.: 14/578,030

(22) Filed: Dec. 19, 2014

(65) Prior Publication Data

US 2016/0098400 A1    Apr. 7, 2016

Related U.S. Application Data

(60) Provisional application No. 62/059,997, filed on Oct. 5, 2014.

(51) Int. Cl.
*G06F 3/0482* (2013.01)
*G06F 3/0484* (2013.01)
(Continued)

(52) U.S. Cl.
CPC .......... *G06F 16/435* (2019.01); *G06F 3/0482* (2013.01); *G06F 3/04842* (2013.01);
(Continued)

(58) Field of Classification Search
CPC ..................................................... G06F 3/0482
(Continued)

(56) References Cited

U.S. PATENT DOCUMENTS 6,842,653 B2    1/2005    Weishut et al.
7,260,309 B2    8/2007    Gutta
(Continued)

FOREIGN PATENT DOCUMENTS

WO    2000065429    11/2000

OTHER PUBLICATIONS

Documentation: VLC for Dummies—VideoLAN Wiki; 4 pages May 21, 2014.

*Primary Examiner* — Sherief Badawi
*Assistant Examiner* — Conrad R Pack
(74) *Attorney, Agent, or Firm* — Fletcher Yoder, P.C.

(57) ABSTRACT

A system and method for improved navigation of available titles for a streaming media service is disclosed herein. After entering a discovery mode, a list of categories is presented to a user. Once a user selects a category, a list of criteria specific to the selected category is presented. After a user selects a criteria, a list of categories can be shown to the user, limited to those categories available after the criteria was selected. After a second category is selected, then a list of criteria, specific to the previously selected criteria and to the second category, is presented. Each time a user selects a new criteria, the number of titles available to a user is reduced. Such a process can be repeated, further limiting the number of titles shown to the user, until a user finally chooses a media file to view. Other embodiments are also disclosed herein.

20 Claims, 18 Drawing Sheets

(51) Int. Cl.
  *G06F 16/435* (2019.01)
  *G06F 16/44* (2019.01)
  *G06F 16/438* (2019.01)
  *H04L 29/06* (2006.01)

(52) U.S. Cl.
  CPC .......... *G06F 16/4387* (2019.01); *G06F 16/44* (2019.01); *H04L 65/4084* (2013.01); *H04L 65/601* (2013.01)

(58) Field of Classification Search
  USPC ........................................................ 715/716
  See application file for complete search history.

(56) References Cited

U.S. PATENT DOCUMENTS

| | | | |
|---|---|---|---|
| 8,315,977 B2 | 11/2012 | Anand et al. | |
| 8,577,896 B2 | 11/2013 | Sanders | |
| 8,689,255 B1 | 4/2014 | Gregov et al. | |
| 9,594,751 B1 | 3/2017 | Gill et al. | |
| 2003/0023975 A1* | 1/2003 | Schrader | H04N 5/4401 725/51 |
| 2003/0146915 A1* | 8/2003 | Brook | G11B 27/11 345/473 |
| 2004/0064476 A1 | 4/2004 | Rounds | |
| 2004/0249782 A1* | 12/2004 | Ricci | G06F 17/30324 |
| 2006/0236349 A1 | 10/2006 | Lee | |
| 2006/0277211 A1* | 12/2006 | Error | G06F 17/3089 |
| 2008/0104051 A1* | 5/2008 | Gosper | G06F 17/30643 |
| 2009/0300016 A1* | 12/2009 | Kile, Jr. | G06F 3/04817 |
| 2009/0319899 A1* | 12/2009 | Moon | G06F 17/30053 715/716 |
| 2009/0319957 A1* | 12/2009 | Blakey | G06F 17/30873 715/854 |
| 2011/0099519 A1 | 4/2011 | Ma et al. | |
| 2011/0270844 A1* | 11/2011 | He | G06F 17/30315 707/745 |
| 2011/0296351 A1 | 12/2011 | Ewing, Jr. | |
| 2012/0023455 A1 | 1/2012 | Chen | |
| 2012/0210343 A1 | 8/2012 | McCoy et al. | |
| 2012/0221954 A1* | 8/2012 | Tanaka | H04L 41/22 715/736 |
| 2012/0311502 A1* | 12/2012 | Reyna | G06F 8/38 715/841 |
| 2012/0330760 A1 | 12/2012 | Zito et al. | |
| 2013/0132857 A1 | 5/2013 | Shapiro | |
| 2013/0159445 A1 | 6/2013 | Zonka et al. | |
| 2013/0238710 A1 | 9/2013 | Meshulam et al. | |
| 2014/0101142 A1 | 4/2014 | Gomez Uribe et al. | |
| 2014/0101192 A1 | 4/2014 | Sabah et al. | |
| 2014/0108614 A1 | 4/2014 | Gunderson et al. | |
| 2014/0172501 A1 | 6/2014 | Meshulam et al. | |
| 2014/0208268 A1 | 7/2014 | Jimenez | |
| 2015/0073931 A1* | 3/2015 | Ronen | G06Q 30/0631 705/26.7 |
| 2015/0309715 A1 | 10/2015 | Riga et al. | |
| 2016/0066040 A1 | 3/2016 | Webster et al. | |

\* cited by examiner

400

DISCOVER    Recommended    Movies    TV   } 302

Salt
410

Zero Dark Thirty
412

The Bourne Identity
414

320

Start 100,000 titles o  Mood o  Period o  Place o  Plot o  Praise 430        432        434        436

SYSTEM AND METHOD FOR IMPROVED NAVIGATION OF AVAILABLE CHOICES

CROSS-REFERENCE TO RELATED APPLICATIONS

This application claims the benefit of Provisional Patent Application Ser. No. 62/059,997, filed Oct. 5, 2014, which is incorporated by reference.

TECHNICAL FIELD

This disclosure relates generally to a media files, and relates more particularly to physical media files and related streaming media files.

BACKGROUND

People often desire to view or listen to content at their home or place of business. Content may include media such as movies, television shows, and music. Music is often purchased in the form of physical media such as CDs as well as via digital media, such as MP3s. Music may also be streamed. Movies and television shows may be purchased in the form of physical media such as DVDs and Blu-rays. Movies also can be streamed or downloaded using a variety of file formats and streaming services. It can be desirable to provide an improved viewing experience for users of a streaming service by enabling a user to more quickly and easily find a media file to view or listen to.

People often desire to view or listen to content at their home or place of business. Content may include media such as movies, television shows, and music. The proliferation of high-speed Internet connections has led to the increasing popularity of content-delivery over the Internet compared to using physical media (e.g., optical discs, hard drives, tapes, and the like). Content-delivery may involve satisfying a user's search request, but content delivery also can involve allowing a user to browse the choices of a content-delivery system. It can be desirable to have the browsing capabilities of a content-delivery system be as user-friendly as possible. Thus, it also is desirable to be able to use improved browsing capabilities on content-delivery systems.

BRIEF DESCRIPTION OF THE DRAWINGS

To facilitate further description of the embodiments, the following drawings are provided in which.

Figure 1:
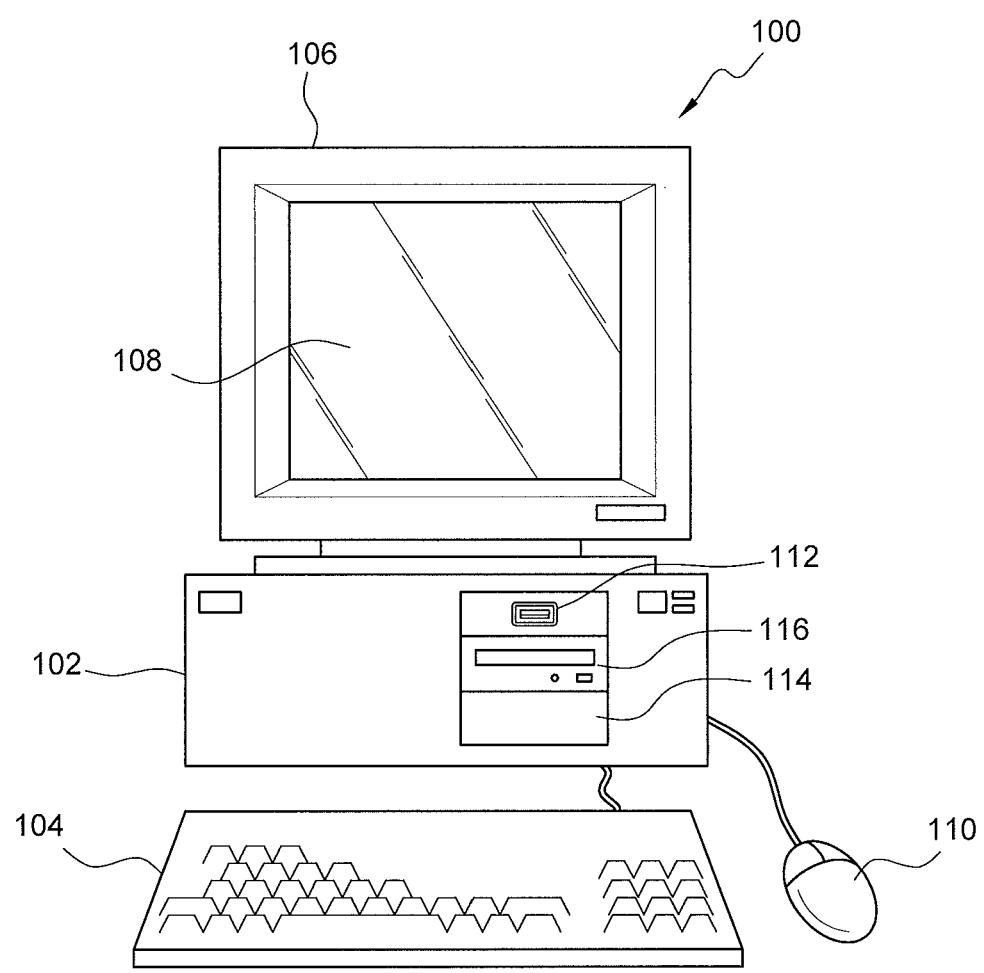
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION

In one embodiment, a method can comprise: transmitting for display a first list of available categories, the first list of available categories being selected from a database comprising a list of media files and the first list of available categories; receiving a selection for a first category of the first list of available categories; transmitting for display a first list of available criteria within the first selected category, using the database to determine the first list of available criteria; receiving a selection for a first criteria of the first list of available criteria; using the database to filter the list of media files based on the first selected criteria to create a first filtered list of media files; transmitting for display the first filtered list of media files; receiving a selection for a media file from the first filtered list of media files; and facilitating playback of the selected media file.

In one embodiment, a system can comprise: one or more processing modules; and one or more non-transitory storage modules storing computing instructions configured to run on the one or more processing modules and perform the acts of: transmitting for display a first list of available categories, the first list of available categories being selected from a database comprising a list of media files and the first list of available categories; receiving a selection for a first category of the first list of available categories; transmitting for display a first list of available criteria within the first selected category, using the database to determine the first list of available criteria; receiving a selection for a first criteria of the first list of available criteria; using the database to filter the list of media files based on the first selected criteria to create a first filtered list of media files; transmitting for display the first filtered list of media files; receiving a selection for a media file from the first filtered list of media files; and facilitating playback of the selected media file.

In one embodiment, a method can comprise: displaying, in a first display area of a screen, a list of available categories, the first display area comprising a home position and one or more secondary positions; displaying, in a second display area of the screen, a first list of available selections; receiving a first input selecting a first category from the list of available categories displayed in the first display area of the screen; moving the first category to the home position in the first display area of the screen; displaying the first category in the home position of the first display area of the screen; replacing the first list of available selections in the second display area of the screen with a second list of available selections based on the first category; and displaying, in the one or more secondary positions of the first display area, a list of available sub-categories based on the first category and while the first category is displayed in the home position of the first display area of the screen.

In one embodiment, a system may comprise: one or more processing modules; and one or more non-transitory storage modules storing computing instructions configured to run on the one or more processing modules and perform the acts of: displaying, in a first display area of a screen, a list of available categories, the first display area comprising a home position and one or more secondary positions; displaying, in a second display area of the screen, a first list of available selections; receiving a first input selecting a first category from the list of available categories displayed in the first display area of the screen; moving the first category to the home position in the first display area of the screen; displaying the first category in the home position of the first display area of the screen; replacing the first list of available selections in the second display area of the screen with a second list of available selections based on the first category; and displaying, in the one or more secondary positions of the first display area, a list of available sub-categories based on the first category and while the first category is displayed in the home position of the first display area of the screen.

Figure 2:
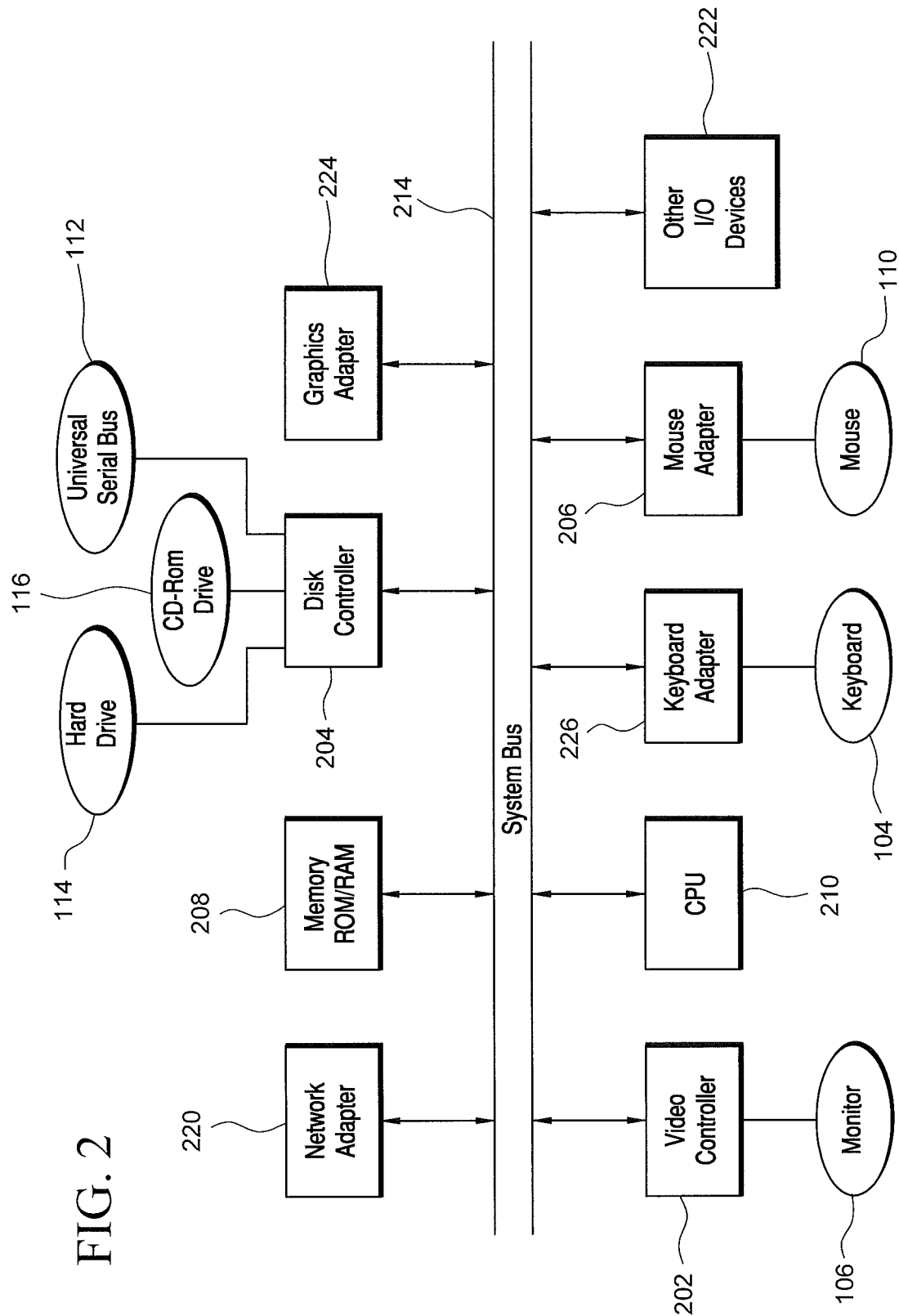
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100—(FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 might or might not contain each of the items shown in FIG. 1 or 2 or might in fact contain multiple of each of the items shown in FIG. 1 or 2. For example, certain implementations of computer system 100 might not contain a CD-ROM, DVD, or Blu-ray drive 116. Other implementations of computer system 100 might contain two CD-ROM, DVD, or Blu-ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD). Computer system 100 could be a special-purpose machine, such as a set-top box or video game console. In other embodiments, computer system 100 can be a general-purpose computer.

Today's technology provides many different ways for users to access content. Optical discs provide music, movie, and television ("TV") show content to users in a high-quality, yet compact medium. High-speed Internet allows users to "stream" or otherwise download content over the Internet to their Internet-capable devices, without the need to use physical media. The terms stream and download might be used interchangeably in the remainder of this specification. Exemplary content can include, but is not limited to, movies, music, TV shows, books, magazines, podcasts, radio shows, and the like. Internet-capable devices can include, but are not limited to, set-top boxes, gaming consoles, personal computers, tablets, smartphones, and the like. Some Internet-capable devices also provide the capability to read optical media, such as compact discs (CDs), Digital Versatile Discs (DVDs), and Blu-ray through the use of an attached or built-in optical reader and/or writer. As of 2014, exemplary Internet capable devices can include smartphones, tablets such as Apple's iPad, Microsoft's Surface, Samsung's Galaxy Tab, and Amazon's Kindle Fire, set top boxes or plug-in devices such as Roku, Google's Chromecast, and Apple TV, video game devices such as Sony's Playstation 3 and Playstation 4, Nintendo's Wii and Wii U, and Microsoft's Xbox 360 and Xbox One, personal computers (including both desktop and laptop devices), Blu-ray and DVD drives, and smart TVs.

With such a device, a user can select content that he wishes to read, view, and/or hear. The user can read, view, and/or hear the content on or from a built-in display, or via an attached TV, monitor, and/or speakers.

Embodiments provide a method and system by which users can navigate across movie and TV shows and find their desired content quickly and easily. In one embodiment, a user is able to see which media files he has previously watched or started to watch. In such a manner, a user is able to view a movie or an episode of a TV show at the point they stopped watching, even if the user is on a different device.

In some embodiments, 7 there can be a new method of allowing a user to explore content. This method can be an interactive, journey-based metaphor to discover new content.

The interface references the design language of an underground subway system. A user can select various categories (mood, plot, praise, period), and from there select from a granular drop down menu of choices, which refine and filters the results returned.

The interface represent a journey across time, and a user can see how her choices evolve over time.

Today's interfaces for content delivery systems typically rely on several different features. Many content delivery systems allow users to search for works, thus allowing the user to find content by title, by actor, by director, and the like. Many content delivery systems also use a recommendation feature, whereby content is suggested for a user based on previous purchases.

For users who are unsure of what content to view or listen to, many content delivery systems allow a user to "Browse" the collection of content. Often, the browse feature relies on genres to make finding relevant content more easy for the users.

A genre is a category of media based on some set of stylistic criteria. For example, the genre of comedy relates to stories about funny or comical events. An exemplary comedy movie is Dumb and Dumber. The genre of fantasy might involve stories about magic or supernatural forces. Exemplary movies in the fantasy genre can include movies in the Lord of the Rings trilogy.

A problem with typical use of genres is that they can be too broad. Wikipedia lists only 21 different main genres, and the Internet Movie Database (IMDb) lists 22 different main genres. With some content delivery systems providing tens of thousands of available titles, separating all those titles into merely 21 or 22 genres fails to sufficiently narrow down the available choices for the users. While there can be sub-genres to further divide the genres, such a system does not always allow a user to fully browse the available media. For example, while some content delivery systems provide for more advanced use of sub-genres, none allow full user control of the browsing.

Figure 3:
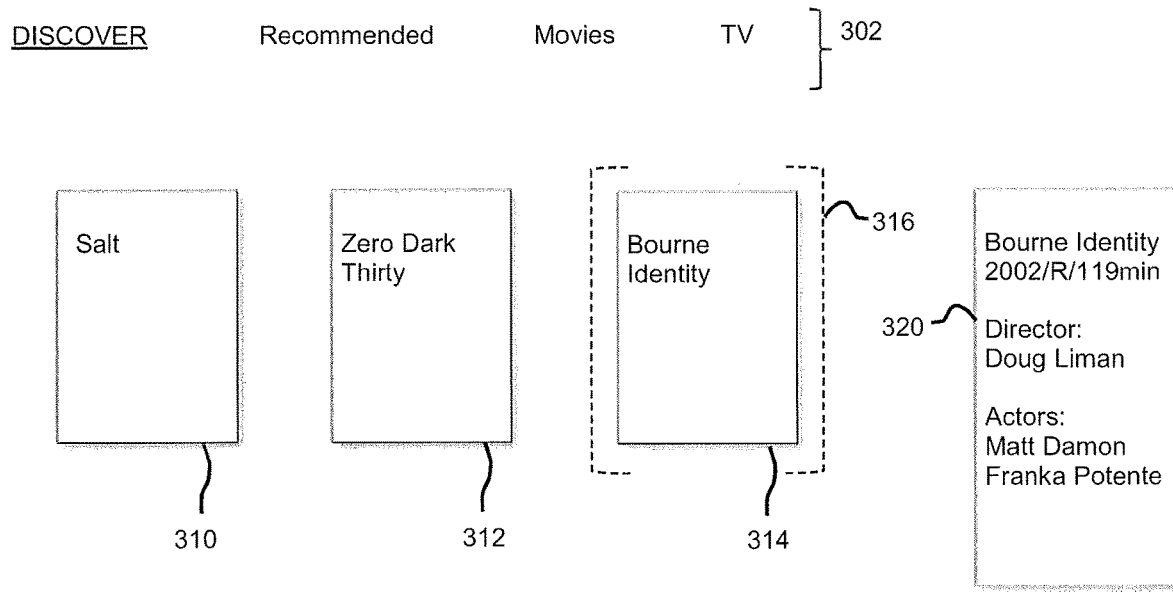
FIG. 3 illustrates a representative screen shot of an embodiment.
Figure 3:
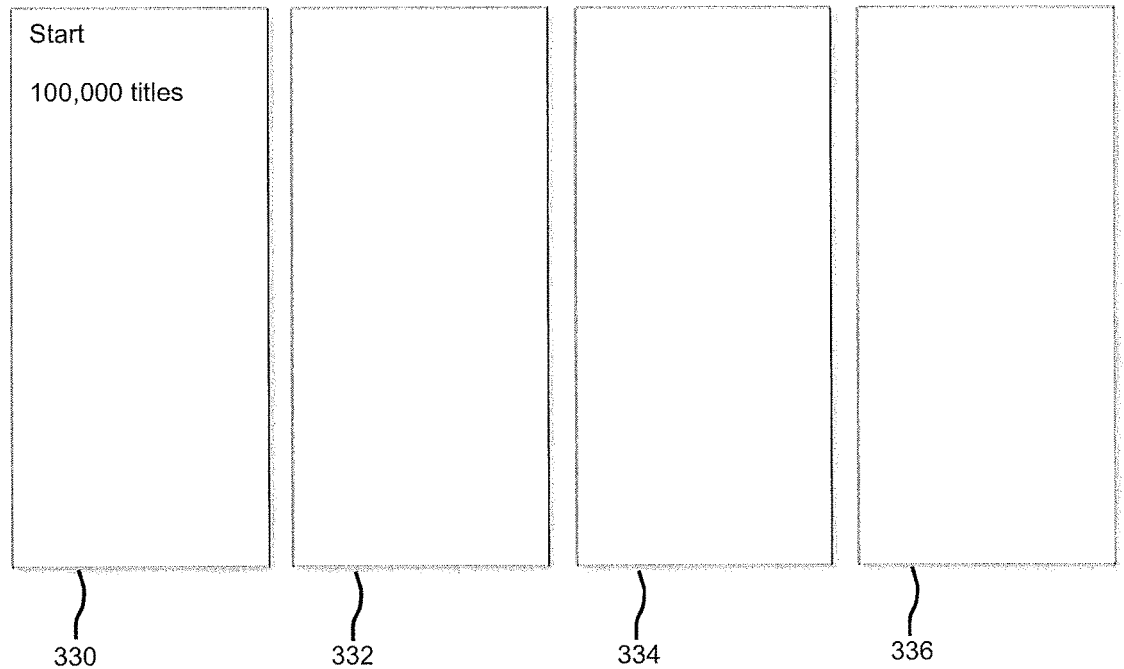

With reference to FIG. 3, an exemplary screen 300 of an embodiment is presented. FIG. 3 is merely exemplary and embodiments of the screen representation and menu system are not limited to the embodiments presented herein. The screen representation and menu system can be employed in many different embodiments or examples not specifically depicted or described herein. Screen shot 300 can be shown on a screen of monitor 106 (FIG. 1).

There are various elements of screen 300 to enable a user more easily find media content to view or listen to. Screen 300 can contain a menu 302 with various choices. In the example shown in FIG. 3, exemplary menu choices can include Discover, Recommended (which can contain recommended media content), Movies (which can contain a selection of available movies), and TV. In FIG. 3, the leftmost choice, Discover, is underlined to indicate that it is the selected menu choice. In some embodiments, the selected menu choice can be highlighted such that it is brighter than the other available menu choices. In some embodiments, the selected menu choice can be a different color than the other menu choice. In some embodiments, the selected menu choice can be in a large font than the other menu choices. In some embodiments, a combination of the above menu choices can be used to indicate the selected menu choice. In some embodiments, other words can be used to indicate the choices. For example, the words "Browse," "Explore," "Reveal," and the like can be used instead of "Discover."

The top row of boxes can contain a selection of movies. In FIG. 3, the choices are box 310, box 312, and box 314. Within each of the boxes is a title of the selection. The text can be in a font that is standardized throughout the boxes. In some embodiments, the text can be stylized, as designed by a distributor of the selection. There can also be an image representative of the selection. For example, there can be a movie poster (or portion thereof) or other image that is associated with the selection. The selections shown in boxes 310, 312, and 314 can change depending on the choices made by a user in the bottom row of boxes, to be detailed below. The number of boxes displayed to the user can be changed such that more or less than 3 boxes are displayed. There can also be navigation elements (not shown in FIG. 3) that allow a user to scroll and view additional selections. Exemplary navigation elements can include a scroll bars, one or more arrows, and the like.

Also present in screen 300 is a detail box 320. Detail box 320 can show further information about one of boxes 310, 312, and 314. The detail box can be associated with a media file selector. An exemplary media file selector might be cursor 316, which can be moved by a user using a remote control or other type of interface. Other types of media file selectors can be used, in different formats. While cursor 316 is illustrated as brackets in FIG. 3, other media file selectors can be used, such as underlining, highlighting, and the like. In the example shown in FIG. 3, cursor 316 is on box 314, the movie "The Bourne Identity." While box 314 might show only the title "The Bourne Identity," and possibly an image representative of the movie, detail box 320 can be configured to show production information (such as the year of release, Motion Picture Association of America (MPAA) rating (such as G, PG, PG-13, R, and NC-17), director, actors, and the like. There also can be user generated information, such as a star rating of the movie (either generated by other users of the streaming service or from an external source, such as IMDb, Metacritic, Rotten Tomatoes or the like). There also can be information about the cost or availability of the movie (e.g., if the movie has already been purchased by the user or if the movie is currently available under the user's subscription plan.) In some embodiments, detail box 320 is shown only when a cursor 316 is highlighting one of boxes 310, 312, or 314.

In FIG. 3, the Discover menu choice represents a unique method of browsing through a selection of media files according to an embodiment. The bottom portion of screen 300 features a row of side panels 330, 332, 334, and 336. There also can be navigation elements (not shown in FIG. 3) that allow a user to scroll and view additional side panels. These panels will be discussed in more detail below. At any time, a user can navigate up to select a poster which interests the user, or, the user can go back and change the selections, should the user change his or her mind. Or the user can navigate down to side panels 330, 334, 334, and 336 to begin a Discover session.

As opposed to a pure genre representation, an embodiment featuring navigation using an embodiment allows users to browse through movies in a more free-form manner. In some embodiments, instead of being presented with genres such as action, science fiction, and horror, the user can be presented with various categories such as Mood, Plot, Period, Place, and Praise. Each of these categories represents, not movies or TV shows to watch, but ways for a user to further explore the movie choices. Each of the categories can contain a plurality of criteria that limit the number of available selections. For example, Mood can be selected from a list containing criteria including, but not limited to terms such as: atmospheric, biting, bittersweet, bleak, captivating, clever, contemplative, cynical, disturbing, emotional, exciting, feel good, gloomy, humorous, mind bending, and scary. In other words, "mood" is not strictly related to genre in the manner that the word genre is typically used, but is related instead to how the movie is intended to make the viewer feel. A movie can have more than one criteria for the category mood. For example, a movie can be tagged with both scary and clever.

The Plot category contains criteria that describe what the movie is about. Exemplary plot criteria can include the following: against the odds, cons and scams, criminal heroes, disaster, fighting the system, friendship, heroes, supernatural, vengeance, and zombie and the like. A movie can have more than one criteria for the category Plot. For example, a movie can be tagged with both disaster and zombie.

For the Period category, each criteria can cover a time period in which a movie took place. Exemplary criteria can include various time periods, such as the following: 18th century, 19th century, 20th century, 1950s, 1960s, 1980s, the future, and the like. A movie can have more than one criteria for the category Period. For example, a movie can be tagged with both 20th century and 1950s. Or a movie can take place over a longer period of time and thus be tagged with 20th century, 1950s and 1960s.

The Place category can cover where a movie takes place. The Place can be broad or narrow. Exemplary criteria within the place category can include the following: Africa, Asia, casino, high school, the moon, the White House, and the like. A movie can have more than one criteria for the category place. For example, a movie can be tagged with both United States and the White House.

The Praise category can cover acclaims that a movie has received. Exemplary praise categories can include the following: Cannes Festival winner, critically acclaimed, Emmy winner, Golden Globe winner, Oscar winner, and the like. A movie can have more than one criteria for the category Praise. For example, a movie can be tagged with both Golden Globe winner and Oscar winner.

There can be additional categories available, such as "style," "based on," "audience," and the like. Embodiments are not limited to those set forth in this patent application.

An embodiment allows a user to set criteria in one category, be shown the number of titles that meet the criteria and exemplary titles that meet the criteria. Then the user can set another criteria (in the same category or in a different category). Then the number of titles can be narrowed and the exemplary titles can change.

Figure 4:
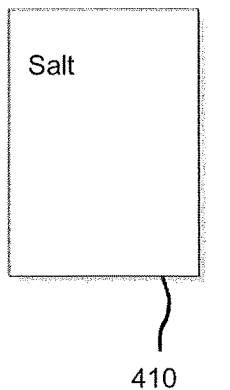
FIG. 4 illustrates a representative screen shot of an embodiment.
Figure 4:
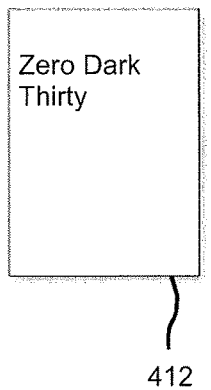
Figure 4:
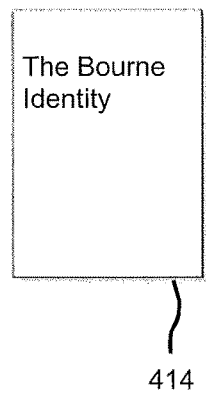
Figure 4:
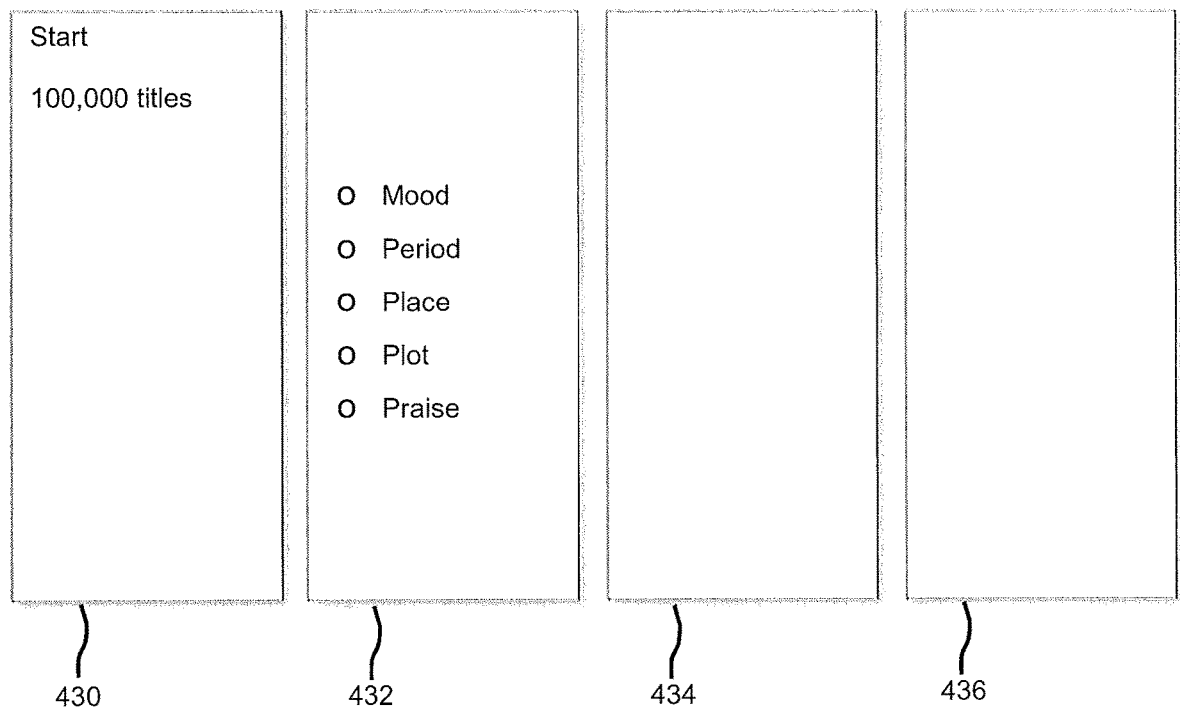

For example, referring back to FIG. 3, a user might have 100,000 titles available. If the user wants to begin a discover session, the user might be presented with a screen shot similar to screen shot 400 of FIG. 4. FIG. 4 is merely exemplary and embodiments of the screen representation and menu system are not limited to the embodiments presented herein. The screen representation and menu system can be employed in many different embodiments or examples not specifically depicted or described herein. Screen shot 400 can be shown on a screen of monitor 106 (FIG. 1).

At screen 400, the screen is very similar to screen 300, with the presence of boxes 410, 412, and 414, which might be the same choices as boxes 310, 312, and 314 available in screen 300. The key difference is in the bottom row of boxes. The user has selected to start the Discover process by selecting box 430. In turn, the user is presented with several available categories in box 432. Available categories might include: Mood, Period, Place, Plot, and Praise. Other categories can also be shown in box 432.

Figure 5:
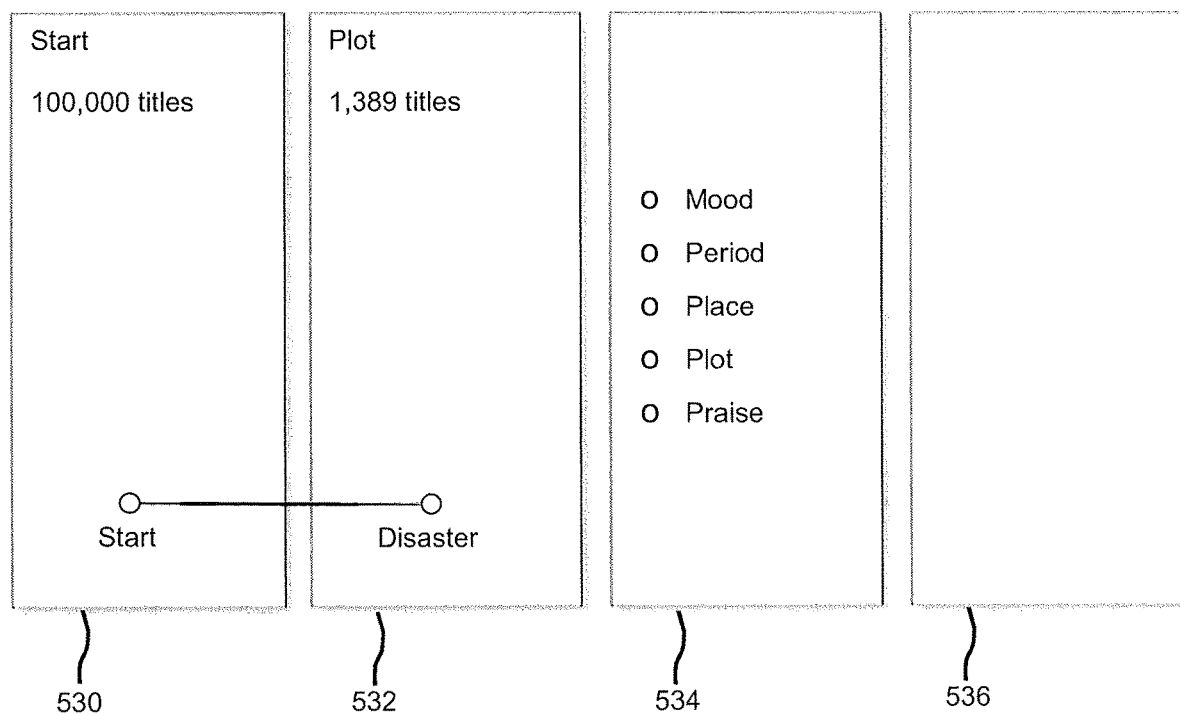
FIG. 5 illustrates a representative screen shot of an embodiment.

To continue with this example, the user can select Plot and then be presented with various criteria to further explore. As described above, there can be many different available plots. Exemplary plots can include, but are not limited to, the following: against the odds, cons and scams, criminal heroes, disaster, fighting the system, friendship, heroes, supernatural, vengeance, and zombie and the like. In the examples that follow, the user will be assumed to choose "disaster." The result is shown in FIG. 5 as screen shot 500. FIG. 5 is merely exemplary and embodiments of the screen representation and menu system are not limited to the embodiments presented herein. The screen representation and menu system can be employed in many different embodiments or examples not specifically depicted or described herein. Screen shot 500 can be shown on a screen of monitor 106 (FIG. 1).

At screen 500, the screen is similar to screen 400. After choosing the "disaster" criteria within the plot category, the number of available titles is reduced to 1,389 titles (as shown in box 532). The movies shown in boxes 510, 512, and 514, are now movies tagged with the plot, "disaster": Titanic, Apollo 13, and Flight. Boxes 530 and 532 can configured to show the user which choices he has already made, in this case, that he selected the criteria "Disaster" for the category "plot." Box 534 shows additional categories that the user can use to further narrow down the available choices. While the categories Mood, Period, Place, and Praise are shown in the embodiment of FIG. 5, some embodiments can use other categories or additional categories.

Figure 6:
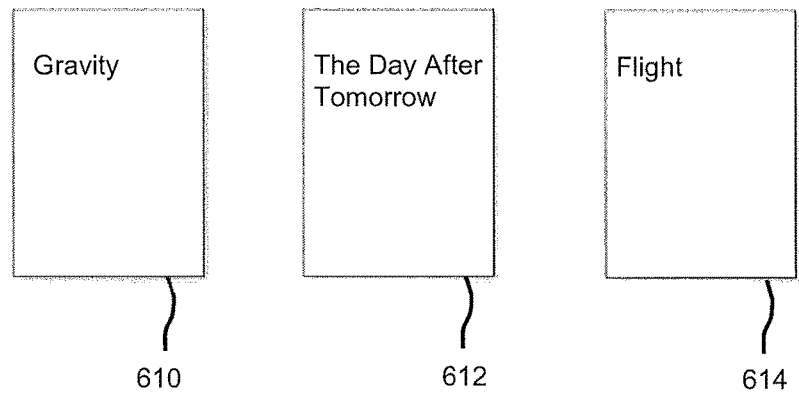
FIG. 6 illustrates a representative screen shot of an embodiment.
Figure 6:
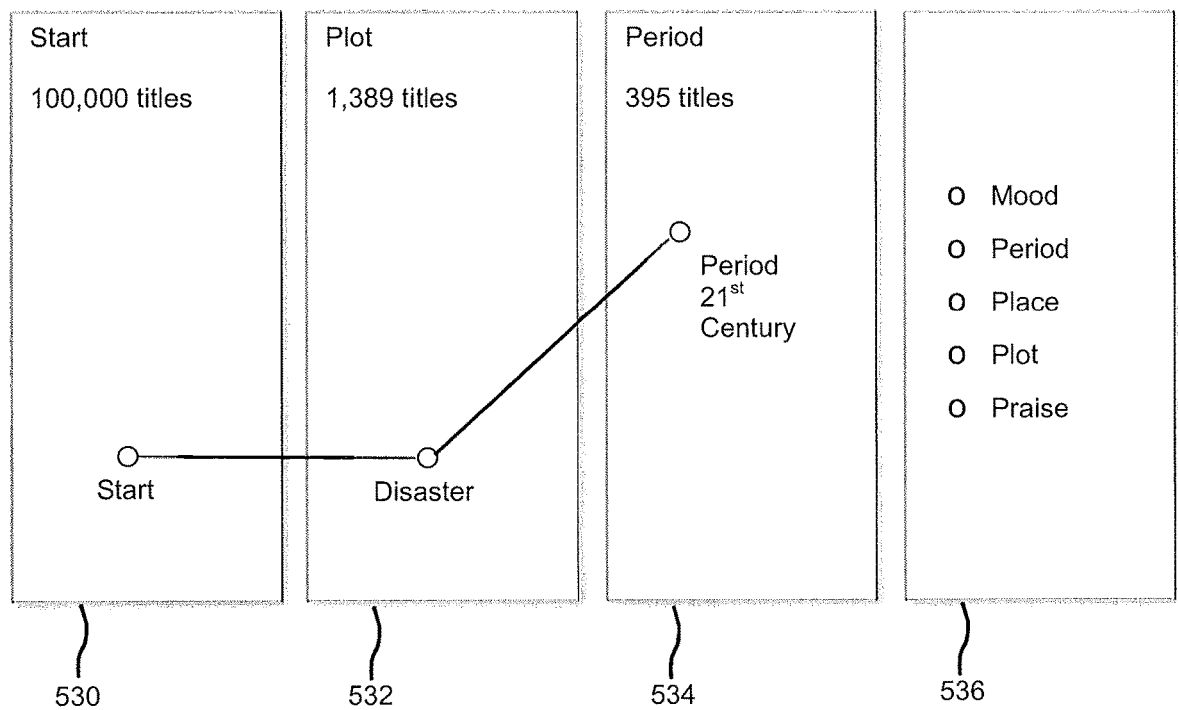

The user can then narrow the 1,389 titles by choosing the category, "Period." The result is shown as screen shot 600 in FIG. 6. FIG. 6 is merely exemplary and embodiments of the screen representation and menu system are not limited to the embodiments presented herein. The screen representation and menu system can be employed in many different embodiments or examples not specifically depicted or described herein. Screen shot 600 can be shown on a screen of monitor 106 (FIG. 1).

Once the user selects period, the user is presented with a list of criteria from which to select (not shown in FIG. 6). The list of criteria can contain available periods, such as 20th century, 1950s, 1960s, and the like. In the example shown in FIG. 6, user chose the criteria "21st century" as the Period. The 1,389 titles is reduced to 395 titles. The titles shown in boxes 610, 612, and 614 can change if the titles shown previously are no longer applicable. For example, the movies shown now that the user has selected 21st century can include movies that are tagged with the 21st century criteria, such as Gravity, The Day After Tomorrow, and Flight.

If the user does not wish to scroll through 395 titles, the user can choose to further limit the choices by selecting yet another criteria. This new criteria can be in a category that the user already used or the new criteria can be in a category that the user has not already used. A list of available categories to choose from is located in box 636. In FIG. 6, the available categories are shown as Mood, Place, Praise, and Style. Other embodiments can use other categories or additional categories.

Figure 7:
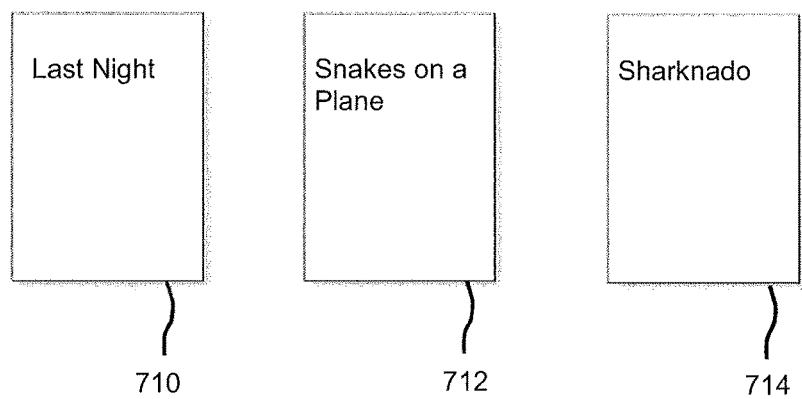
FIG. 7 illustrates a representative screen shot of an embodiment.
Figure 7:
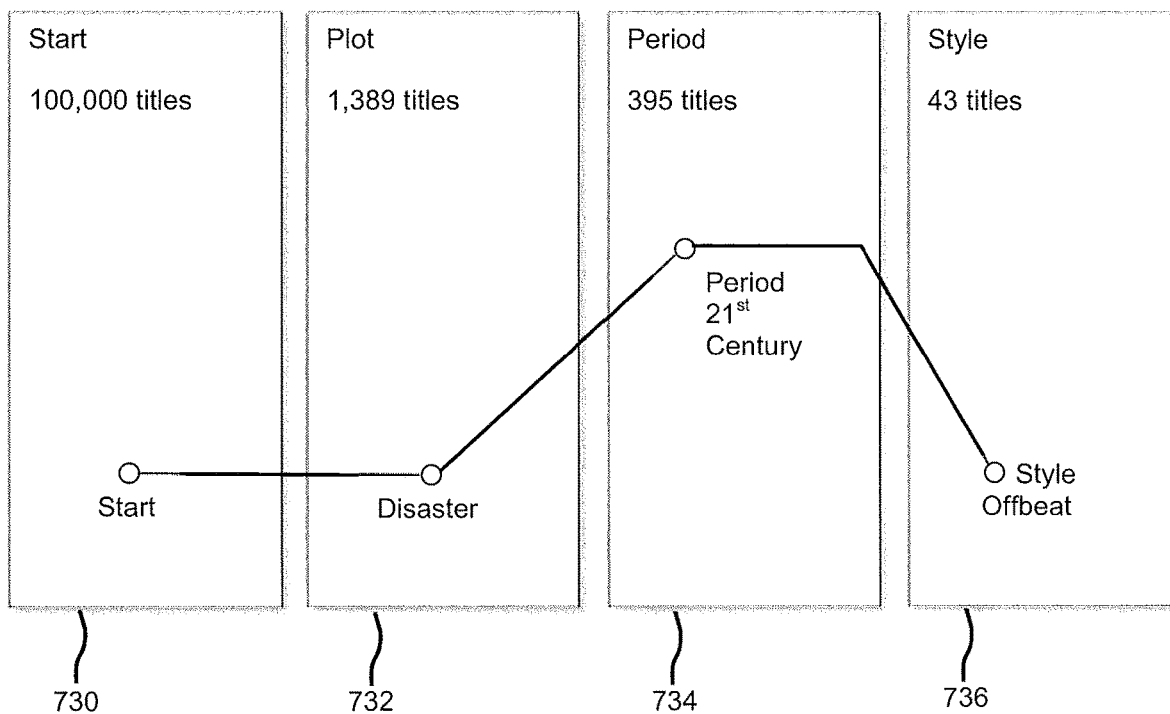

For example, the user can select the "Mood" category and choose the criteria, "Offbeat." The result is shown as screen shot 700 in FIG. 7. FIG. 7 is merely exemplary and embodiments of the screen representation and menu system are not limited to the embodiments presented herein. The screen representation and menu system can be employed in many different embodiments or examples not specifically depicted or described herein. Screen shot 700 can be shown on a screen of monitor 106 (FIG. 1).

Once the user selects "Mood," the user is presented with a list of criteria within "Mood" from which to select (not shown in FIG. 7). The list of criteria can contain available moods, such as atmospheric, biting, bittersweet, bleak, captivating, clever, contemplative, cynical, disturbing, emotional, exciting, feel good, gloomy, humorous, mind bending, and scary, and the like. In FIG. 7, the 395 titles has been reduced to 43 titles by the selection of the Mood titled "offbeat." The titles shown in boxes '710, 712, and 714 can change if the titles shown previously are no longer applicable. For example, the movies shown now that the user has selected the "offbeat" criteria can include Last Night, Snakes on a Plane, and Sharknado.

Although not shown in the drawing Figures, the user can continue to select more and more limitations if the user so desires. In some embodiments, a user is able to select multiple criteria within a category. For example, within a "Praise" category, a user can select both "Golden Globe award winner" and "Oscar award winner." In another example, a user can select "20th century" within the Period category, then realize that there are still too many choices and then select "1960s."

Figure 8:
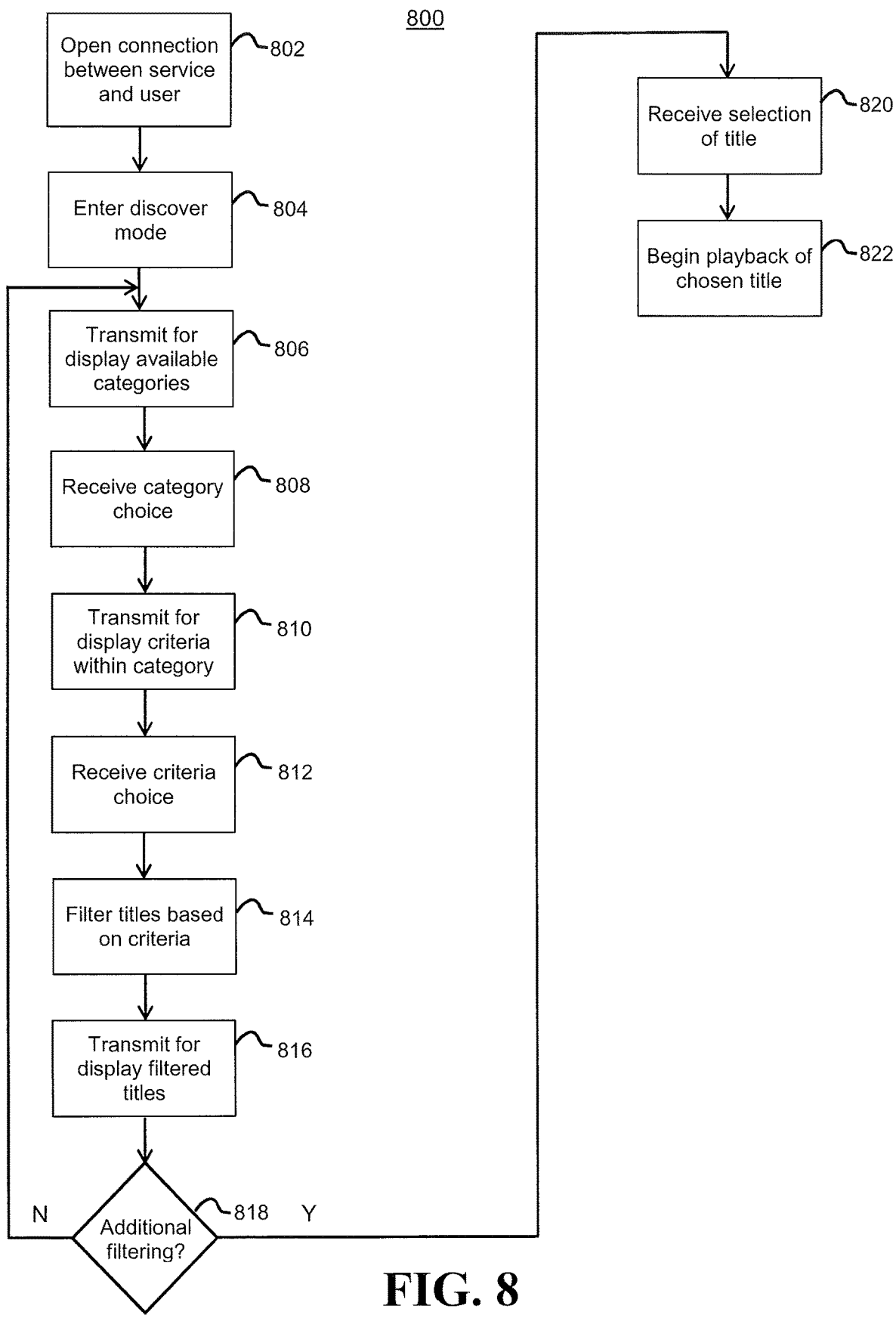
FIG. 8 illustrates flowchart illustrating the operation of system for an improved method of discovering available media files.

With reference to FIG. 8, a flowchart illustrating the operation of a method 800 of an embodiment is disclosed. Method 800 is merely exemplary and is not limited to the embodiments presented herein. Method 800 can be employed in many different embodiments or examples not specifically depicted or described herein. In some embodiments, the procedures, the processes and/or the activities of method 800 can be performed in the order presented. In other embodiments, the procedures, the processes, and/or the activities of method 800 can be performed in any other suitable order. In still other embodiments, one or more of the procedures, the processes, and/or the activities of method 800 can be combined or skipped. In some embodiments, method 800 can be implemented by computer system 100 (FIG. 1).

A user opens a connection to a streaming service (block 802). Typically, this can be accomplished by a user logging in to the streaming service by entering his credentials (such as a user name and password). In some embodiments, after an initial entry, such credentials can be saved such that the credentials do not have to be entered every time the user logs in. In some embodiments, two-factor authentication can be used to provide additional security.

The user then indicates the desire to enter the Discover mode (block 804). Typically, this can be accomplished by the user using a remote control or similar device to move a cursor to a Discover mode, then indicating the selection of the Discover mode using the remote control (such as by using a select or enter button on the remote control.)

A list of categories can be transmitted for display to the user (block 806). The list of categories can include every possible category in an embodiment. In some embodiments, the list of categories can be narrowed based on which categories are "available." In other words, as seen below, block 806 can be performed more than once. The second and subsequent times block 806 is being performed, the list of available media files has already been filtered. The way in which the media files have been filtered can result in some of the categories not being available. To take a simple example, in the category Period, if the criteria 16th century has been chosen, there might not be any more criteria within the category that will further filter the available media files. In such a situation, the category Period might not be available to be chosen by the user.

There can be a database that stores a list of all the media files stored in the streaming service. The database can include information about every media file, such as a title of the media file, associated graphics of the media file, metadata about the media file (e.g., the year the media file was produced, who directed the media file, who starred in the media file, and the like). The database can also include all the available categories. The available categories can include the following: mood, plot, genres, period, place, audience, praise, humor, style, and "based on." Additional categories can also be used. As explained above, each category can have a list of criteria. The criteria can also be stored in the database. For example, the category "period" can include criteria such as 15th century, 16th century, 17th century, and the like.

The user then selects a category to filter the available titles (block 808). After he chooses a category, a list of criteria within the category is transmitted for display to the user (block 810). The list of criteria can include every possible criteria in a category. In some embodiments, the list of criteria can be narrowed based on which categories are "available." In other words, as described in further detail below, block 810 can be performed more than once. The second and subsequent times block 810 is being performed, the list of available titles has already been filtered. The manner in which the titles have been filtered can result in some of the criteria not being available. For example, in the category Mood, if the criteria "feel good" has been chosen, there might not be any titles that fit the criteria "bleak." In such a situation, the criteria "bleak" might not be available to be chosen by the user. The user then selects one of the displayed criteria (block 812).

In response, an embodiment then filters the available titles to include only titles that include the selected criteria (block 814). This filtering can be accomplished in a variety of different manners. In some embodiments, the database might tag each media file with one or more criteria. The criteria can be in one or more different categories. For example, the movie Titanic can have the following criteria within the category Mood: emotional, captivating, and sentimental. The movie Titanic can have the following criteria within the category Plot: survival, disaster, fall in love, danger, escapades, love and romance, young lovers, opposites attract, and social differences. The movie Titanic can have the following criteria within the category Period: 20th century, and 1910s. As can be seen, every title can have many different criteria (in one embodiment, the movie Titanic might have 37 different criteria). An embodiment then filters the available titles to include only titles that include the selected criteria.

The filtering can occur in one of a variety of different manners. In some embodiments, the database can use a bitmap index to store the various criteria. In other words, instead of having each criteria placed in a field within a database, each criteria might have a field in a database. Any criteria that is applicable to a particular title is marked with a binary 1 and any criteria that is not applicable to a particular title can be marked with a binary 0.

The list of available media files is made available to the user, along with the number of available media files (block 816). Thereafter, the user is able to perform additional filtering (block 818). If the user wishes to perform additional filtering, the process can resume at block 806. Otherwise, the user can browse through the available media files. The user can then choose an available media file to view (block 820). Playback of the chosen media file can then be facilitated (block 822). This can be accomplished in a variety of different manners. In some embodiments, the chosen media file might be associated with additional media files. The media file(s) can then be transmitted to the user, along with instructions to a program receiving the media file to begin playback of the media file(s).

Figure 9:
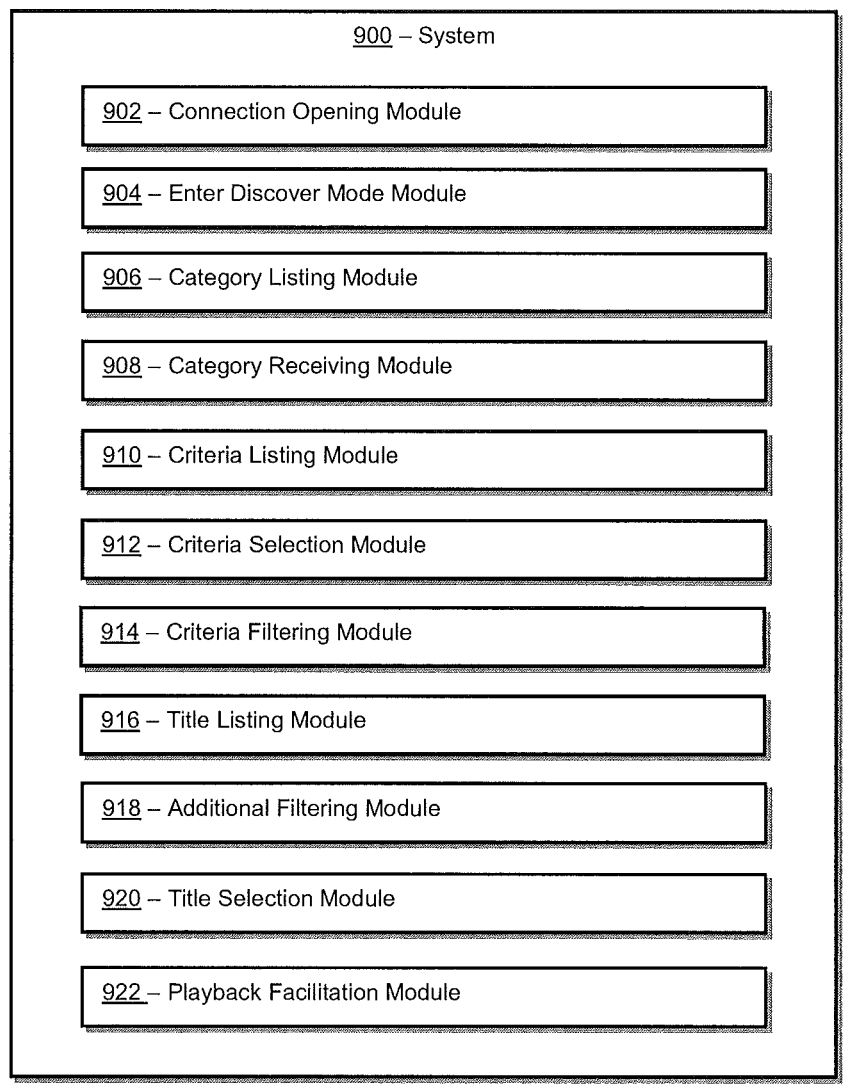
FIG. 9 is a block diagram illustrating an exemplary system for discovering available media files.

Turning ahead in the figures, FIG. 9 illustrates a block diagram of a system 900 that is capable of performing disclosed embodiments. System 900 is merely exemplary and is not limited to the embodiments presented herein. System 900 can be employed in many different embodiments or examples not specifically depicted or described herein. In some embodiments, certain criteria or modules of system 900 can perform various procedures, processes, and/or acts. In other embodiments, the procedures, processes, and/or acts can be performed by other suitable elements or modules.

In a number of embodiments, system 900 can include a connection opening module 902. In certain embodiments, connection opening module 902 can perform block 802 (FIG. 8) of opening a connection between a user and system 900.

Returning to FIG. 9, system 900 can include an enter Discover mode module 904. In certain embodiments, enter Discover mode module 904 can perform block 804 (FIG. 8) of entering a Discover mode.

Returning to FIG. 9, system 900 can include a category listing module 906. In certain embodiments, category listing module 906 can perform block 806 (FIG. 8) of displaying a list of categories.

Returning to FIG. 9, system 900 can include a category receiving module 908. In certain embodiments, category receiving module 908 can perform block 808 (FIG. 8) of receiving a chosen category from a user.

Returning to FIG. 9, system 900 can include a criteria listing module 910. In certain embodiments, criteria listing module 910 can perform block 810 (FIG. 8) of listing criteria.

Returning to FIG. 9, system 900 can include a criteria selection module 912. In certain embodiments, criteria selection module 902 can perform block 812 (FIG. 8) of receiving a criteria from a user.

Returning to FIG. 9, system 900 can include a criteria filtering module 914. In certain embodiments, criteria filtering module 914 can perform block 814 (FIG. 8) of filtering titles based on a selected criteria.

Returning to FIG. 9, system 900 can include a title listing module 916. In certain embodiments, title listing module 916 can perform block 816 (FIG. 8) of listing available titles.

Returning to FIG. 9, system 900 can include an additional filtering module 918. In certain embodiments, additional filtering module 918 can perform block 818 (FIG. 8) of allowing a user to perform additional filtering.

Returning to FIG. 9, system 900 can include a title selection module 920. In certain embodiments, title selection module 920 can perform block 820 (FIG. 8) of receiving a selection of a title from a user.

Returning to FIG. 9, system 900 can include a playback facilitation module 922. In certain embodiments, playback facilitation module 902 can perform block 822 (FIG. 8) of facilitating playback of the chosen title.

Figure 10:
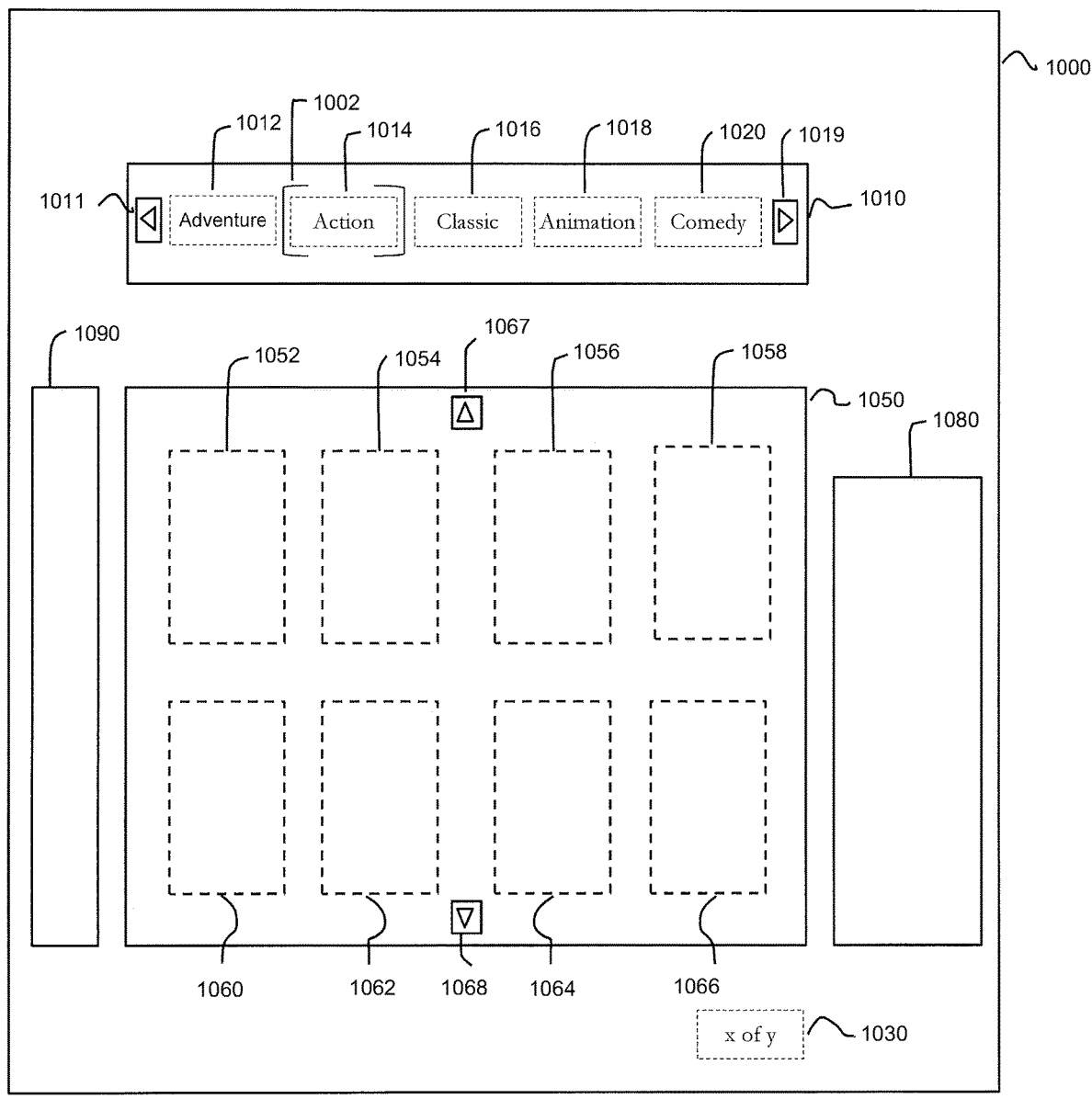
FIG. 10 illustrates an exemplary screen shot of an embodiment.

Turning ahead in the drawings, FIG. 10 is an example of a screen representation of a menu system of an embodiment. FIG. 10 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 10 can perform various procedures, processes, and/or activities. In other embodiments, the procedures, processes, and/or activities can be performed by other suitable elements or modules of FIG. 10.

The screen representation of FIG. 10 can be created by a system illustrated in FIGS. 1 and 2. Such a system can include, but is not limited to, a video game system, a set-top box, a personal computer (in either a desktop or a laptop form), an optical disc player, a smart TV, and the like. In some embodiments, the screen shown in FIG. 10 can be a web page shown in a browser. In some embodiments, the screen shown in FIG. 10 can be a page shown in an "app" of a tablet or smartphone. In some embodiments, the screen shown in FIG. 10 can be a page shown on a TV screen by a video game system, a set-top box, a personal computer (in either a desktop or a laptop form), an optical disc player, a smart TV, and the like.

Screen 1000 comprises several display areas, including a first display area 1010, a second display area 1050, a third display area 1080, a fourth display area 1030, and a fifth display area 1090.

First display area 1010 can comprises a menu featuring a list of available categories 1012, 1014, 1016, 1018, and 1020. In some embodiments, first display area 1010 can be referred to as a ribbon area or a ribbon panel. In one embodiment, a home position can be the left-most position of first display area 1010, e.g., the position used by available category 1012 in FIG. 10. The remaining positions can be called secondary positions. In some embodiments, the list of available categories is scrollable. For example, although five categories are listed on a screen at any one time, there can be additional number of categories accessible through the use of navigation devices. There can be a navigation device at one or both sides of first display area 1010 to allow a user to scroll through other available categories. Exemplary navigation devices can be arrow 1011 and arrow 1019. By accessing arrow 1011 and 1019, additional categories can be viewed. It should be understood that other types of navigation devices can be used, including, but not limited to, horizontal scroll bars, vertical scroll bars, and other visual indicia of the availability of additional content.

Also shown in FIG. 10 is a cursor 1002. Cursor 1002 can take one of a variety of different forms. As illustrated in FIG. 10, cursor 1002 can take the form of a bracket that fits around one of categories 1012, 1014, 1016, 1018, and 1020. It should be understood that cursor 1002 is not so limited in form. Cursor 1002 can be of a different color or different shade from a background color. Cursor 1002 also can use a combination of tactics for visibility, such as the use of both brackets and coloring/shading. There can be other configurations of cursor 1002, as long as a user is able to distinguish a category merely being displayed and a category being selected. In some embodiments, cursor 1002 also can be moved from first display area 1010 to other areas of the screen, such as second display area 1050, third display area 1080, fourth display area 1030, and/or fifth display area 1090.

Available categories 1012, 1014, 1016, 1018, and 1020 can take a variety of different formats. For example, in an embodiment being used to view video content, each of available categories 1012, 1014, 1016, 1018, and 1020 can be an available genre that is available to be viewed. Exemplary genres include labels such as adventure, animation, classic cinema, action, comedy, crime & thriller, documentary, drama, fantasy, musical, mystery, science fiction, and the like.

Within second display area 1050 is a list of available content. In an embodiment, before a category in display area 1010 is selected, second display area 1050 can be configured to display a certain content as a default view, while displaying, in the first display area, the list of available categories. For example, in an embodiment used to display video content, the default view in the second display area can be popular movies. In another embodiment, the default view can be new movies. In another embodiment, the default view can be based on prior usage. For example, in some embodiments, a user of a system using an embodiment can have an account with a video content provider. Thus, the user can have a history associated with the system, where the history can comprise movies and or TV episodes that the user has viewed, rented, or purchased in the past. Thereafter, the default view can be configured such that "recommended" movies are shown in the second display area. The recommended movies can be based on the user's prior viewing history. Thus, a user who likes foreign movies might have a different default view than a user who watches a lot of science fiction movies.

In an embodiment, second display area 1050 can be configured such that it displays only available content that is restricted by a category being selected by cursor 1002. For example, in an embodiment used to display video content, if the cursor is on an "Action" genre in first display area 1010, selections 1052, 1054, 1056, 1058, 1060, 1062, 1064, and 1066 can represent video content within the action genre, such as movies from the Transformers, James Bond, Batman, Expendables, the X-Men series, and the like.

Second display area 1050 is configured such that, when one of selections 1052, 1054, 1056, 1058, 1060, 1062, 1064, and 1066 is selected by a user, the user is able to view and/or listen to the content. In an embodiment used for video content, as described above, each of selections 1052, 1054, 1056, 1058, 1060, 1062, 1064, and 1066 can represent a movie or TV episode. When the user moves cursor 1002 over his chosen selection within second display area 1050 and indicates his desire to view the movie through a particular action (such as pressing a particular switch on a remote control, video game controller, or touchscreen interface), an appropriate media file is then transmitted to the user: The appropriate media file is then played. An embodiment can facilitate the playing of the media file in one of a variety of different manners. In some embodiments, the media file is transmitted to a remote location. The remote location can be the device with which the user is accessing the embodiment. In some embodiments, the transmission can be a downloaded, such that the entire media file is transmitted before it is played. In some embodiments, the transmission can be streamed, such that playback of the media file can begin before the entire media file is transmitted to the user's media playback device. The transmission and playback of audio media files can be accomplished in a similar manner.

In an embodiment being used to select audio content, each of available categories 1012, 1014, 1016, 1018, and 1020 can be an available musical genre that is available to be chosen. Exemplary genres can include labels such as classical, pop, jazz, rock, hip-hop, blues, electronic music, and the like. In such an embodiment, within second display area 1050 is a list of available audio content that can be restricted by category. For example, if cursor 1002 is on a "Classical" genre, selections 1052, 1054, 1056, 1058, 1060, 1062, 1064, and 1066 can be audio content within the Classical genre. For example, symphonies by Beethoven, concertos by Mozart, and operas by Wagner can make up selections 1052, 1054, 1056, 1058, 1060, 1062, 1064, and 1066. When cursor 1002 is moved to a "Jazz" genre, the selections in second display area 1050 can be changed to jazz artists, such as Miles Davis, John Coltrane, Spyro Gyra, and the like. In some embodiments, the changing of the second display area can occur whenever cursor 1002 is moved to a different category or genre. In other embodiments, the changing of the second display area can occur after a user selects a category or genre.

In addition to genres, categories 1012, 1014, 1016, 1018, and 1020, can take other forms. In one embodiment, each of categories 1012, 1014, 1016, 1018, and 1020 can represent of list. The list can be any type of list. For example, the list could be the top 20 movies or music pieces for a particular week. The list could be movies that have been nominated for a particular award. The list could be musical pieces that have been nominated for a particular award. The list could be a compilation. For example, a list of movies that won a Best Picture Oscar or a list of movies listed in a particular organization's "Best of the Year" list. The list could be songs that reached number 1 on a chart any time in the 1990s. The list could be new releases for a particular month. The list could be by studio. For example, there could be a list for Disney animated movies, Pixar animated movies, Nickelodeon TV shows, CBS TV shows, and the like. The list could be by actor, such as a list featuring Robert De Niro movies or a list featuring Marlon Brando movies. The list could be by TV series, such as a list of Doctor Who episodes or Simpsons episodes. The list could be memorable sports moments, such as game-winning Super Bowl drives. The types of lists that could be generated for categories 1012, 1014, 1016, 1018, and 1020 are not limited to those listed herein.

In some embodiments, while second display area 1050 is shown in FIG. 10 as containing eight possible choices, there can be more or less than eight possible choices within the chosen category or sub-category or filter (described in more detail below). Therefore, it can be desirable for second display area 1050 to be scrollable to allow a user to scroll through available selections in order to find the movie/TV show to view or audio selection to listen to. In some embodiments, second display area 1050 contains a first navigation device 1067 and a second navigation device 1068. Navigation devices 1067 and 1068 can be configured to allow a user to scroll through available choices. For example, navigation devices 1067 and 1068 can be configured to appear as arrows to the user. In other embodiments, there is only one navigation device 1067 present and it can be in the form of a scroll bar (vertical or horizontal). Other embodiments are also possible. In some embodiments, either navigation device 1067 or 1068 can be grayed-out or otherwise not accessible to a user in certain situations. For example, if there are no further selections (e.g., the user is at the top of the list of available selections or the bottom of the list of available selections or there are fewer available selections than there are spaces on the screen), the display can be configured such that the cursor cannot get to one or both of navigation device 1067 or 1068.

A user is able to navigate through the interface by moving cursor 1002. In an embodiment, a user has access to a device that enables the movement of cursor 1002. For example, a user can have a video game controller, such as a controller of the type used to control an Xbox 1060, Xbox One, Playstation 10, Playstation 4 or Wii U. A user can have a remote control such as the type commonly used to control televisions and audio/video devices. These remote controls can control a device using infrared signals or can control a device using radio frequency (RF) signals. In an embodiment using a video game controller or in an embodiment using a remote control, a user can use arrow keys on the controller to change the on-screen location of cursor 1002. Then the user can depress a select switch to make a particular selection.

When a user makes a selection, a variety of actions can occur. For example, the cursor might be within second display area 1050 on one of selections 1052, 1054, 1056, 1058, 1060, 1062, 1064, and 1066 when the selection is made. In an embodiment being used to view video content, each of selections 1052, 1054, 1056, 1058, 1060, 1062, 1064, and 1066 could represent a movie or an episode of a television show. Thus, selecting one of 1052, 1054, 1056, 1058, 1060, 1062, 1064, and 1066 starts the chosen movie/episode. In an embodiment being used to select audio content, each of selections 1052, 1054, 1056, 1058, 1060, 1062, 1064, and 1066 could represent a song or album or "station" of the selected category.

If the cursor is within first display area 1010 on one of categories 1012, 1014, 1016, 1018, or 1020, the user can select the chosen category. Doing so can cause several things to happen. In one embodiment, the chosen category can move to the home position. For example, in one embodiment (as shown in FIG. 10), category 1012 can be "Adventure", category 1014 can be "Action", category 1016 can be "Classic Cinema", category 1018 can be "Animation", and category 1020 can be "Comedy." If the user selects the category labeled "Action," the graphic for "Action" can be moved to the home position (the left-most position of first display area 1010). Thereafter, the remaining categories can be replaced with sub-categories within the "Action" category. The list of available sub-categories is different from the first list of categories. There can be a variety of manners of displaying sub-categories for each category. For example, the sub-categories can represent the decade the movies were released in. So there could be a 1930s sub-category, a 1940s sub-category, a 1950s sub-category, and the like. In another example, the sub-categories can be for a movie series. So, within the "Action" category, there could be a "James Bond" sub-category, a "Transformers" sub-category, an "X-Men" sub-category, and the like. In another example, the sub-category can be an age range. So there could be an ages 5 and under category, an ages 6-9 category, an ages 10.13 category, and the like. In another embodiment, the sub-categories can be sub-genres within the chosen category. For example, within the "Action" category there can be types of action movies, such as "Blockbuster", "Apocalypse", "Chases", "Comedy", "Espionage", "Heists", and the like. Within each sub-category, there could be more sub-categories. For example, within the "Action" category and the "Comedy" sub-category, there could be additional sub-categories within the Action/Comedy sub-category. In some embodiments, the home position shows the chosen category while displaying, in the one or more secondary positions of the first display area, other categories from the list of categories.

It should be understood that, in an embodiment, it is possible for content to be available under more than one category/sub-category combination. For example, as described above with respect to an embodiment used to display video content, there can be a "Comedy" sub-category within an "Action" category. There also can be an "Action" sub-category within a "Comedy" category. In another example, there can be year based sub-categories within a Category. So a movie can be listed under a "1990s" sub-category under both "Action" and "Comedy. Or a movie can be listed under both "Children's" and "Animation." Or there can be studio-based categories. So a movie can be in a "Children's" category, an "Animation" category, and a "Pixar" category. The same can be true for an embodiment used to play audio content. A particular work (such as Beethoven's Fifth Piano Concerto) can be located in a "Beethoven" category, located in a "Classical" category, located in a "Piano" category, and located in a "Concerto" category.

Figure 12:
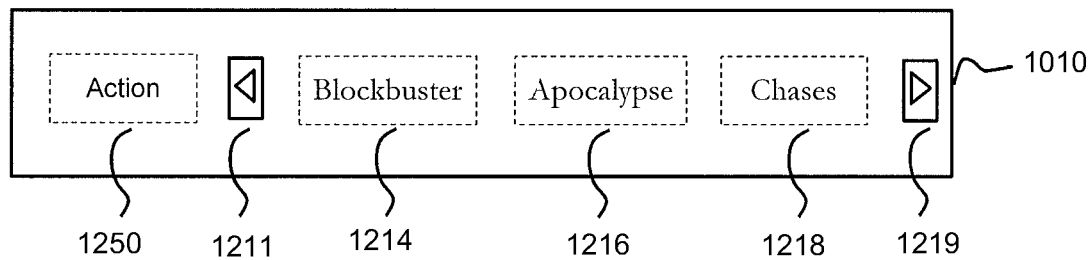
FIG. 12 illustrates an exemplary screen shot of a portion of the screenshot of FIG. 10.

With reference to FIG. 12, an illustration featuring first display area 1010 is presented. In FIG. 10, first display area 1010 is shown with broad categories. The cursor 1002 is on category 1014, "Action." FIG. 12 illustrates the result of first display area 1010 after the "Action" category has been selected by a user. As described above, there can be a series of changes that occur when a category is selected by a user.

First display area 1010 has changed to indicate to the user that a category has been selected. The selected category ("Action" in this example), has been moved to the home position 1250. The placement of the navigation devices has been changed to indicate that the available categories are within the category in the home position. In FIG. 12, navigation devices comprise arrow 1211 and 1219, but they can be replaced by any suitable navigation device that can be used to indicate the presence of additional choices to a user. The categories have been replaced by sub-categories such as sub-categories 1214 ("Blockbuster"), 1216 ("Apocalypse"), and 1218 ("Chases"). While only three sub-categories are shown in FIG. 12, it should be understood that any number of sub-categories can be shown in first display area 1010.

In some embodiments, the sub-categories being displayed can be fixed. For example, in an embodiment used for audio content, selecting a "rock" category can always show the same sub-categories, e.g., "progressive rock," "punk rock," "soft rock," and the like. In other embodiments the sub-categories being displayed can be dynamically chosen based on various criteria. For example, a user's previous history can show that he likes "progressive rock," but almost never listens to "soft rock." Therefore, the next time this user selects the "rock" category, the "soft rock" category can be replaced with another category, but other sub-categories related to "progressive rock" can be displayed, such as "progressive metal" or "symphonic rock." In other embodiments, a user can be able to select or de-select certain categories to force them to be displayed or to prevent them from being displayed.

Returning to FIG. 10, in addition to the changes of first display area 1010, before the user selected the Action category, second display area 1050 can have been configured to show a default selection of movies, including movies in many different genres. After the user selected the Action category, the available selections in second display area 1050 have been changed to show movies within the Action category.

The categories listed in first display area 1010 can be a horizontal row of one or more buttons stating the categories such as Action, Animation, or Comedy. In some embodiments, the horizontal row of one or more buttons can be scrollable. In some embodiments, the buttons can be in the form of text labels. In one embodiment, the text labels are over a representation chosen to illustrate the category. The representation can be an illustration, a photo, an image, a thumbnail, etc. For example, Action could be illustrated by a picture of a Transformer. Animation could be a picture of Shrek. Comedy could be a picture from a Ben Stiller movie. Adventure could be a picture of Indiana Jones. Classic Cinema could be an image from Citizen Kane.

The selections within second display area 1050 can be text labels for selections 1052, 1054, 1056, 1058, 1060, 1062, 1064, and 1066, stating the title of the movie, TV episode, or musical piece being selected. In one embodiment, the text labels can be replaced or augmented with a representation from the movie, TV, episode, or musical piece being selected. The representation can be an illustration, a photo, an image, a thumbnail, a recreation of a poster, and the like. For example, a movie poster representing the movie Toy Story 10 can be used in place of selection 1052; and a movie poster representing the movie Brave can be used in place of selection 1054.

There also can be a third display area 1080. In one embodiment, third display area 1080 can contain information about a currently highlighted selection. For example, in an embodiment used to display video content, if the user's cursor 1002 is on a particular movie (one of selections 1052, 1054, 1056, 1058, 1060, 1062, 1064, and 1066), third display area 1080 can display production information about the movie. Production information can include, but is not limited to, the year the movie was released, the actors in the movie, the director of the movie, the Motion Pictures Association of America ("MPAA") rating, a user rating indicating user reviews of the movie (such as an Internet Movie Database ("IMDb") rating), and a synopsis of the movie. Production information also can include information about how to access the movie. For example, in a subscription-based model, there can be different tiers of subscriptions. Thus, there can be information about whether or not the selected movie is within the user's subscription tier. In an embodiment where movies are purchased or rented, production information can include information about how to purchase or rent the particular movie. In such an embodiment, if a user had previously purchased the movie, the production information can reflect such a purchase and allow the user to view the movie again. Production information also can include information about format. For example, some movies could be available in a standard-definition version, a low-bandwidth high-definition version, a high-bandwidth high-definition version, a 10-D version, and an ultra-high definition (also known as "4K") version. The production information could be configured to show the user the available formats and the cost for each format. In some embodiments, the ability to play movies or TV episodes can be contained in third display area 1080. Thus, the ability to rent a movie, purchase a movie, or play a movie can be in third display area 1080.

When the user moves the cursor 1002 to a new movie (e.g., a different one of selections 1052, 1054, 1056, 1058, 1060, 1062, 1064, and 1066), third display area 1080 can be updated to show information about the newly selected movie. In such a manner, the user is able to view information about a movie, TV episode, or musical piece without obscuring other available choices within second display area 1050.

In an embodiment used for audio content, production information can include information about a chosen musical piece. Such production information can include, but is not limited to, the year of release, a list musicians who performed on the piece, and other information about the musical piece. Such production information also can include information about how to purchase, rent, or otherwise access the chosen musical piece.

There also can be a fourth display area 1030. In some embodiments, fourth display area 1030 can be used to inform the user how many records match a selected criteria. For example, in an embodiment used for video content, fourth display area 1030 might read "25,000 records," informing the user that there are 25,000 movies/TV episodes available for viewing. When the user selects a category corresponding to a genre by moving the cursor within the first display area 1010, fourth display area 1030 can be updated such that it shows the number of movies/TV episodes within that category. When a user further selects a sub-category, fourth display area 1030 can update again to show an even smaller number of movies within the selected sub-category.

Figure 11:
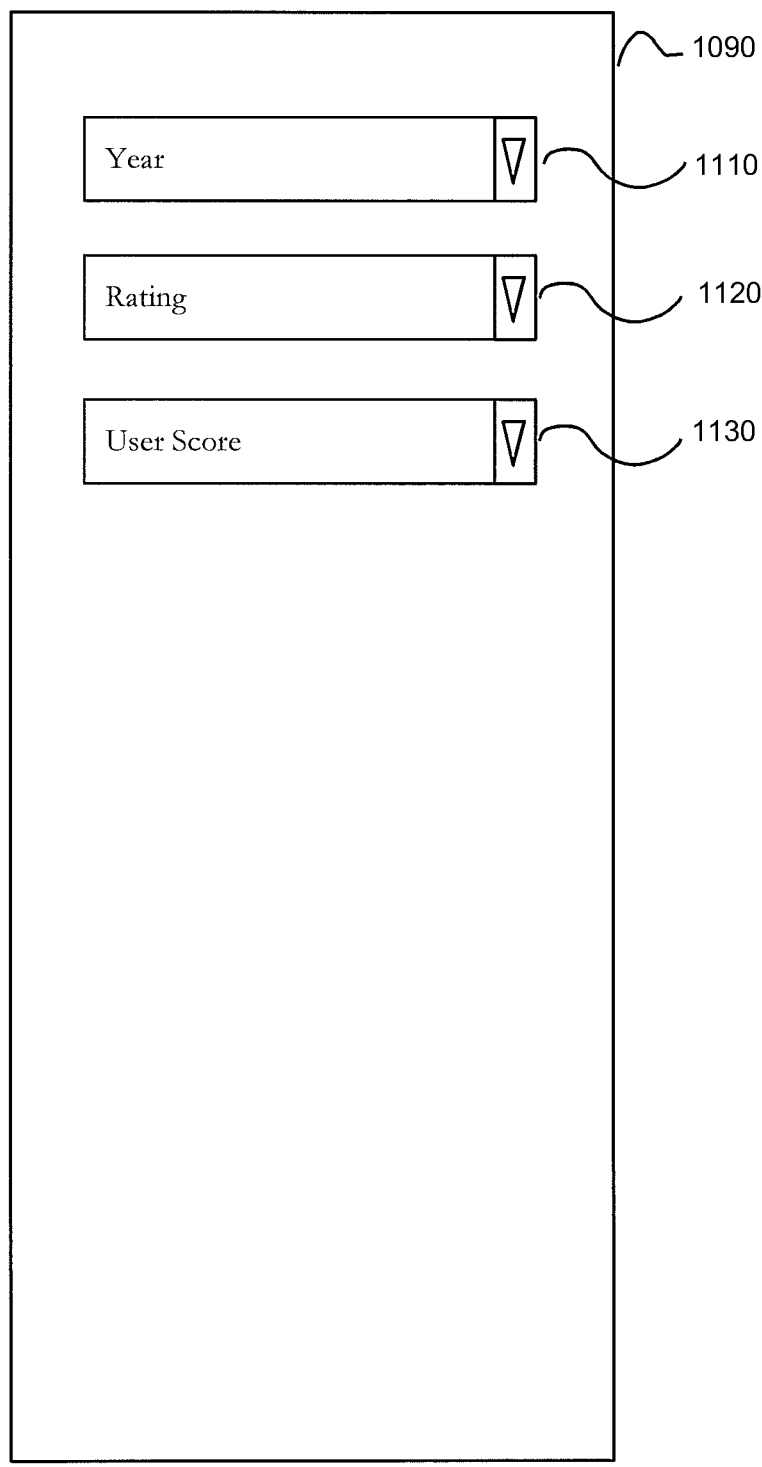
FIG. 11 illustrates an exemplary screen shot of a portion of the screenshot of FIG. 10.

There also can be a fifth display area 1090. In some embodiments, fifth display area 1090 can be used to allow the user to filter the available selections. With reference to FIG. 11, details of fifth display area 1090 are shown in greater detail. Fifth display area 1090 can comprise a series of drop-down boxes 1110, 1120, and 1130. It should be understood that a greater number of drop-down boxes can be displayed. However, only three are shown in FIG. 11 for illustrative purposes. Drop-down box 1110 is shown in FIG. 11 as allowing a user to select a year. For example, in an embodiment used to display video content, the user can select to view movies/TV episodes only after 1990 or only before 2010. In some embodiments, there can be more than one drop-down box for a year input to allow a user to select both a start year and an end year. Through these inputs, a user is able create a filter criteria and send the filter criteria to an embodiment.

When a user selects a year in drop-down box 1110, the remainder of display 1000 changes in reaction. For example, in an embodiment used for video content, fourth display area 1030 can change to display the number of movies/TV episodes that meet the selected criteria. In one embodiment, second display area 1050 changes according to the selected filter. For example, all movies/TV episodes that do not meet the selected criteria in drop-down box 1110 is removed and replaced with movies/TV episodes that do meet the selected criteria.

Exemplary drop-down boxes 1120 and 1130 are also illustrated. Drop-down box 1120 can contain a rating, such as a Motion Picture Association of America (MPAA) rating (e.g., G, PG, PG-13, and R). Thus, a user can create a filter such that only movies with the selected rating are shown in second display area 1050. Drop-down box 1130 can contain a user rating, such as that from the Internet Movie Database (IMDb). In such a manner, a user can create a filter such that only movies with a user score above a certain number are shown in second display area 1050. It should be understood that, as each filter is made, fourth display area 1030 also can change such that the number of movies/TV episodes that meet the filter criteria is shown.

It should be understood that multiple filters can be used simultaneously. For example, a user can select only movies from before 2010 with a "PG-13" rating, that has an IMDb score of at least 7.0.

It should be understood that year, rating, and user scores boxes shown in FIG. 11 are merely exemplary filters. Embodiments are not limited to filters in those categories. Other filters can be used in addition to those shown in FIG.

11. Other filters also can replace the filters shown in FIG. 11. Exemplary filters can include a filter by actor, by director, by studio.

In some embodiments, fifth display area 1090 can present additional options to a user. For example, fifth display area 1090 can provide a sort selector to give a user the ability to sort the available selections available in second display area 1050. In an embodiment used to deliver video content, the user can sort the available selection in a variety of different manners, such as by year of release, by title, by user rating, by MPAA rating, and the like. The user also can have the ability to sort in an increasing manner (e.g., oldest selection first) or in decreasing manner (e.g., newest selection first). In some embodiments, a user is able to select a default sorting method such that selections are always sorted in a certain manner. In some embodiments, in the absence of a chosen sort order or user-selected default sort order, there can be a standard sort order. The standard sort order can choose which available selections are shown on a variety of criteria. Exemplary criteria can include popularity, date of release, or the presence of special promotions. For an example of special promotions, when one movie becomes newly available, previous movies in the series can become promoted such that the user is able to easily find all the movies in a series.

In some embodiments, fifth display area 1090 is not always available. For example, if the chosen category or sub-category has a small number of selections, it may not be advantageous to allow a user to create a filter of the selections. In some embodiments, the number of selections that is used to determine if a fifth display area 1090 is available is if there are more than 40 selections available. If there are 40 or fewer selections, the user should be able to scroll through the selections (using navigation devices 1067 and 1068, for example) without having to first limit the number of selections through the use of a filter. It should be understood that other embodiments can use a different number than 40 selections to determine when to show fifth display area 1090.

Returning to FIG. 10, in some embodiments, one or more of first display area 1010, second display area 1050, third display area 1080, fourth display area 1030, and fifth display area 1090 can be hidden from view when not in use. For example, third display area 1080 can be configured such that it is visible only when a cursor is on one of selections 1052, 1054, 1056, 1058, 1060, 1062, 1064, or 1066. Therefore, when the cursor is in first display area 1010 (selecting a category) or the cursor is in fifth display (creating a filter), third display area 1080 can be hidden from view. In some embodiments, when third display area 1080 is hidden from view, second display area 1050 expands to occupy the space where display area 1080 was located. In some embodiments, fifth display area 1090 can be a small area that merely indicates the ability to create a filter. In such an embodiment, when a user selects fifth display area 1090, fifth display area 1090 can be configured to expand to allow a user to create a filter. In such an embodiment, one or more of the remaining display areas can be configured to shrink and/or move in response to the expanding of fifth display area 1090.

It should be understood that, while each of first display area 1010, second display area 1050, third display area 1080, fourth display area 1030, and fifth display area 1090 are displayed with borders, such a border might not be present in some embodiments. There can be other methods to differentiate between different areas of the screen. In some embodiments, different areas have different amounts of shading, such that first area 1010, for example, has a lighter background than the rest of the screen. Colors also can be used to differentiate between different screen areas. In some embodiments, there might not be any differentiation between different screen areas.

It should be understood that the locations of first display area 1010, second display area 1050, third display area 1080, fourth display area 1030, and fifth display area 1090 are merely exemplary. Other embodiments can have a different layout of the various screen elements. For example, in some embodiments, first display area 1010 is located below second display area 1050. In some embodiments fourth display area 1030 is located within second display area 1050. In some embodiments, fifth display area 1090 can be to the right of second display area 1050. Other layouts also can be used.

Filters in fifth display area 1090 are also not limited to drop-down boxes. Any method of limiting the number of available selections can be used. For example, there can be an area for a user to enter a search criteria such that a user can type in, for example, the name of an actor, and the filter will work to include only movies in which the actor had a starring role.

Figure 13:
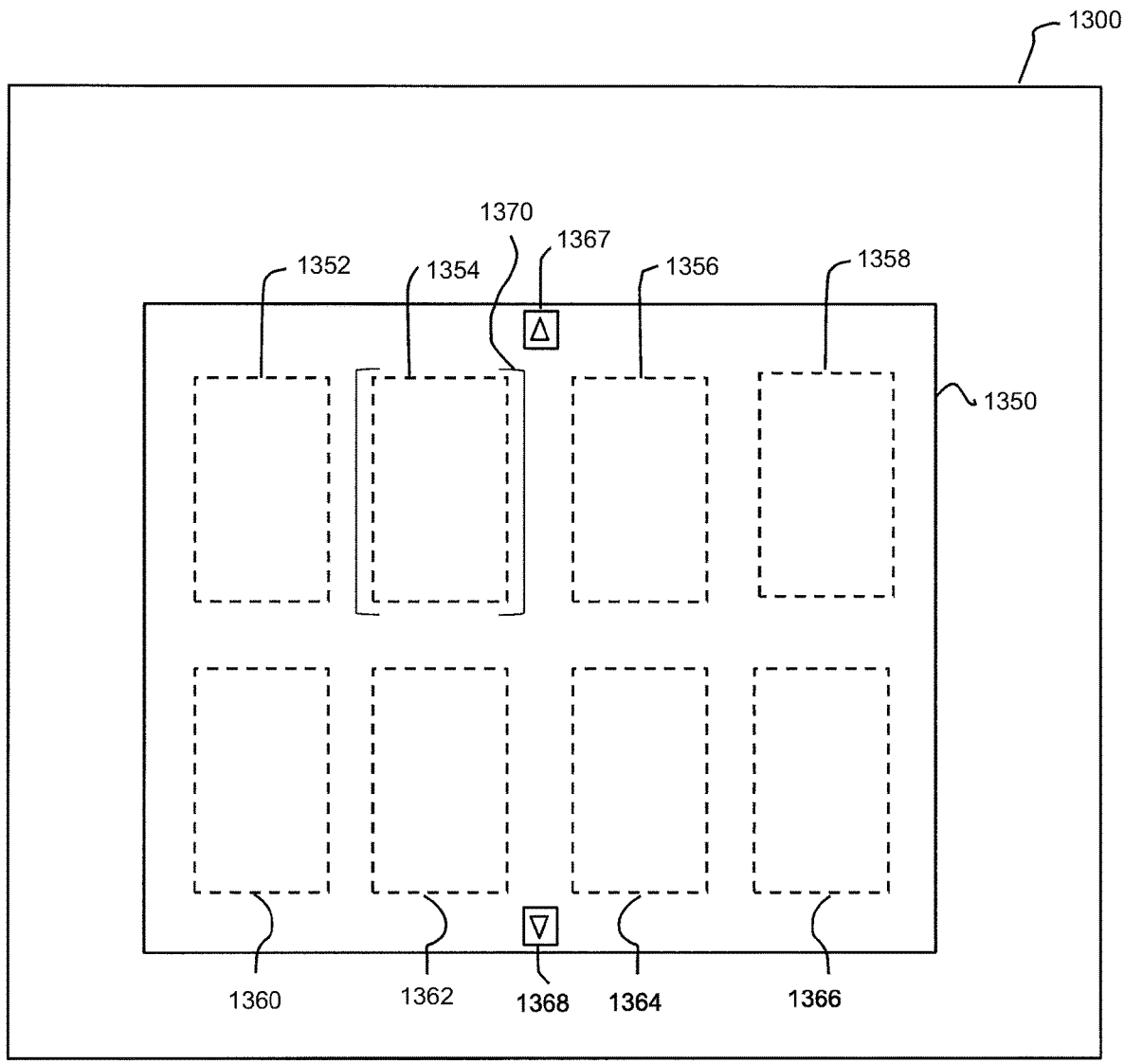
FIG. 13 illustrates an exemplary screen shot of an embodiment.

In some embodiments, a first display area might not be available to a user until the user has made a selection. With reference to FIG. 13, a screen representation of such an embodiment is presented. FIG. 13 is merely exemplary and embodiments of the screen representation are not limited to the embodiments presented herein. The screen representation can be employed in many different embodiments or examples not specifically depicted or described herein. In some embodiments, certain elements or modules can perform various procedures, processes, and/or activities. In other embodiments, the procedures and/or activities can be performed by other suitable elements or modules of FIG. 13.

FIG. 13 illustrates a screen 1300 comprising a second display area 1350, without a first display area. Within second display area 1350 are showcases 1352, 1354, 1356, 1358, 1360, 1362, 1364, and 1366. In some embodiments, second display area 1350 can be the only display area on screen 1300 until after a user selects a showcase.

A showcase can be a predetermined or dynamically created collection of related media. Exemplary showcases can be created to take advantage of various timings. For example, there can be a separate showcase for an upcoming holiday. Thus, there could be a Halloween-themed showcase available in October, a Thanksgiving-themed showcase available in November, and a Christmas-themed showcase available in December. Each of these showcases can feature various media related to the showcase theme. A Halloween-themed showcase could feature scary movies or scary music. A Christmas-themed showcase could feature Christmas movies. When baseball playoffs start, there could be a baseball-themed showcase featuring baseball movies and/or music. When football playoffs start, there could be a football-themed showcase. When the time for airing Academy Awards nears, there could be one or more Academy Award-themed showcases.

There also can be showcases that are based around studios. For example, there could be a Disney showcase featuring Disney animated movies. There could be a Dreamworks animation showcase. There could be a Nickelodeon showcase featuring many of the shows available on the Nickelodeon network. It should be understood that each showcase can have several sub-categories underneath. For example, after selecting the Nickelodeon showcase, a user could be presented with a different list of available showcases, each for various Nickelodeon shows, such as Sponge- Bob SquarePants, The Fairly OddParents, and The Penguins of Madagascar. Within each of those showcases, there could be additional showcases. For example, by selecting SpongeBob SquarePants, a user could be presented with yet another listing of additional showcases, each presenting a different season of the show.

A dynamically created showcase can feature media that is related to media that a user has previously shown interest in. For example, a user who has watched a lot of science documentaries can be shown showcases featuring other science documentaries. A user who watches a lot of musicals can be shown showcases featuring musicals.

In a manner similar to that described above with respect to FIG. 10, in an embodiment, there is a cursor 1370 visible to a user. Via a remote control, video game controller, touch screen, keyboard/mouse, and the like, a user is able to move cursor 1370 among the various showcases 1352, 1354, 1356, 1358, 1360, 1362, 1364, and 1366. In some embodiments, there can be one or more navigation devices such as navigation devices 1367 and 1368 to allow a user to scroll through a scrollable list of showcases. By activating navigation devices 1367 and/or 1368, a user can access additional showcases that were not previously visible.

When a user is interested in a showcase, the user can indicate his interest by placing the cursor on or over the desired showcase and activating a switch, such as a select button on a remote control. Doing so can have a variety of different effects. In some embodiments, another display area becomes visible.

Figure 14:
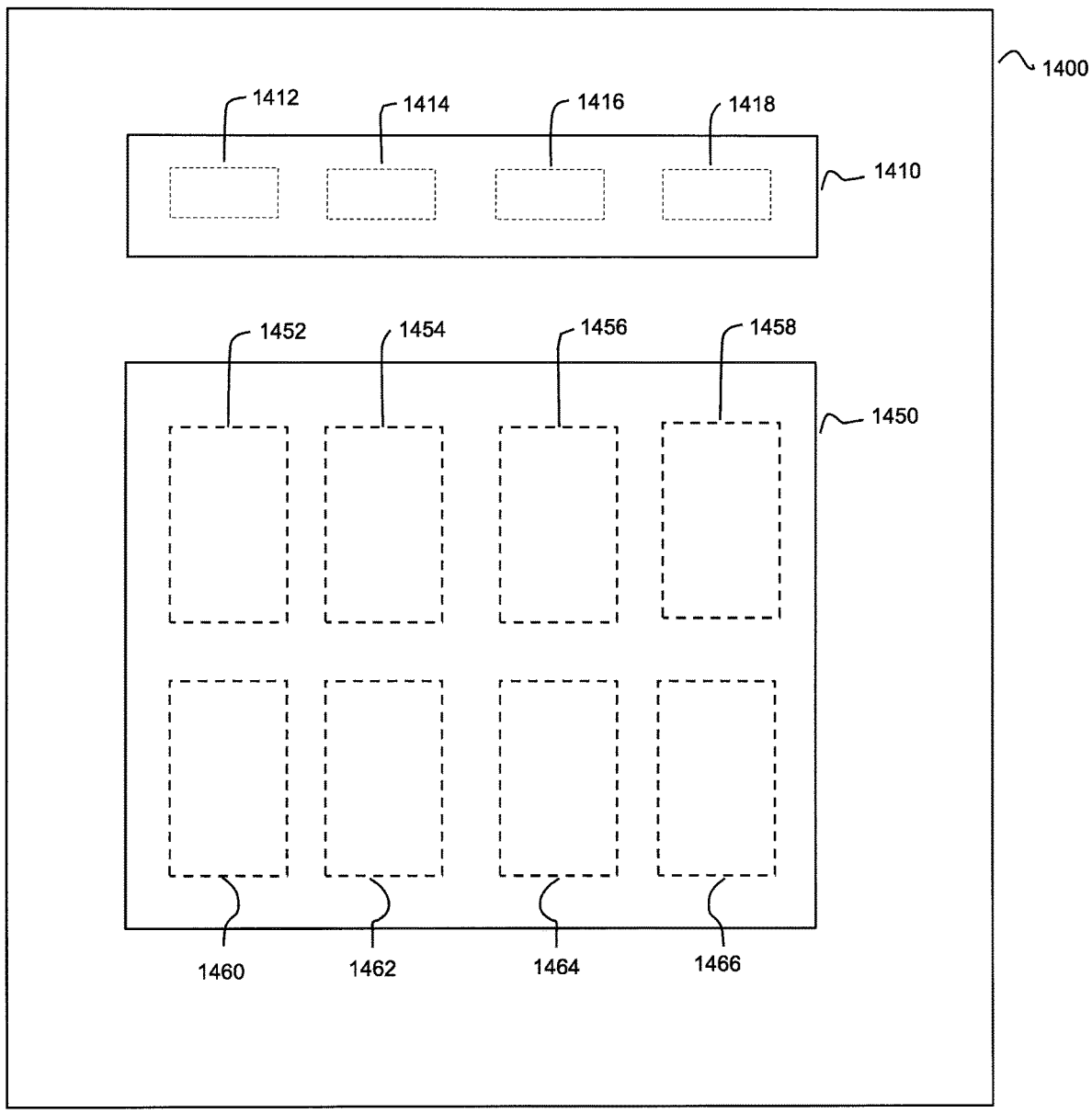
FIG. 14 illustrates an exemplary screen shot of an embodiment.

With reference to FIG. 14, a screen representation 1400 is presented after a user selects a showcase. FIG. 14 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 14 can perform various procedures, processes, and/or activities. In other embodiments, the procedures, processes, and/or activities can be performed by other suitable elements or modules of FIG. 14.

Similar to FIG. 13, there is a second display area 1450 in FIG. 14. More specifically, FIG. 14 illustrates a second display area 1450, which can contain selections 1452, 1454, 1456, 1458, 1460, 1460, 1462, 1464, and 1466. In addition to second display area 1450 is a first display area 1410. First display area 1410 can include categories 1412, 1414, 1416, and 1418. Similar to categories 1012, 1014, 1016, 1018, and 1020 described above with reference to FIG. 10, categories 1412, 1414, 1416, and 1418 in FIG. 14 can take a variety of different forms, such as arrangements or genres. Also similar to category 1012 in FIG. 10, category 1412 in FIG. 14 can be located at a home position. First display area 1410 in FIG. 14 also can have other features similar to first display area 1010 in FIG. 10 such as navigation devices, etc.

Selections 1452, 1454, 1456, 1458, 1460, 1462, 1464, and 1466 in FIG. 14 can be available media to play (such as movies, TV episodes, or musical pieces). They also can be additional showcases, as described above. Selections 1452, 1454, 1456, 1458, 1460, 1462, 1464, and 1466 in FIG. 14 can be similar to selections 1052, 1054, 1056, 1058, 1060, 1062, 1064, and 1066 in FIG. 14, and second display area 1450 in FIG. 14 can have other features similar to second display area 1050 in FIG. 10

Although a third display area, a fourth display area, and a fifth display area (similar to those shown in FIG. 10) are not shown in FIG. 14, it should be understood that one or more such display areas can be present in certain embodiments.

Figure 15:
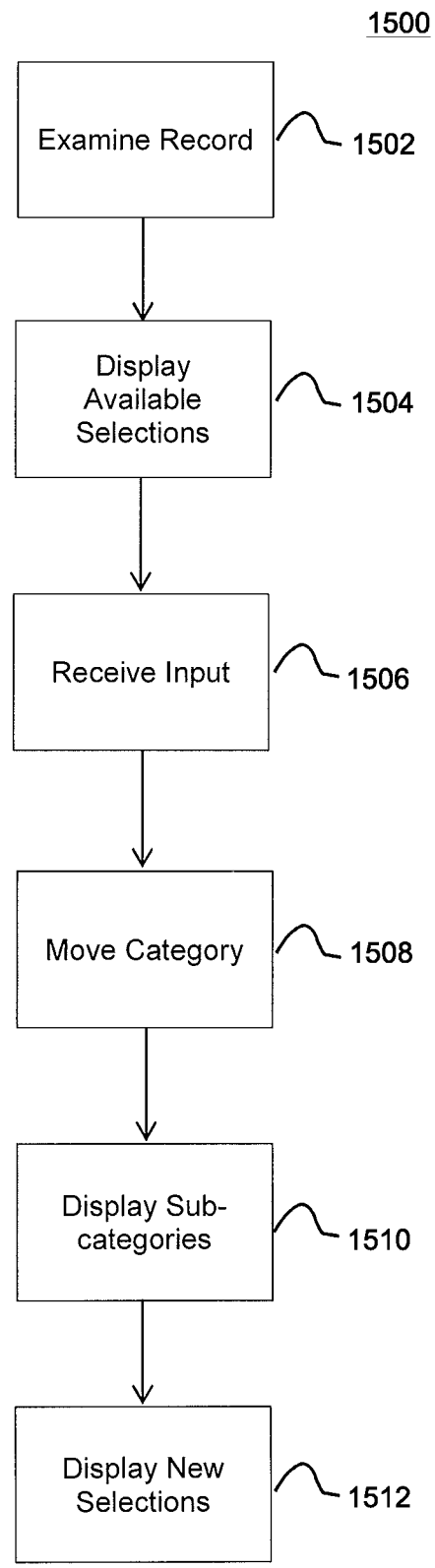
FIG. 15 illustrates a flow chart of a method to navigate a menu according to an embodiment.

Turning ahead in the figures, FIG. 15, a flow chart illustrating a method 1500 to navigate a menu according to an embodiment is presented. Method 1500 is merely exemplary and is not limited to the embodiments presented herein. Method 1500 can be employed in many different embodiments or examples not specifically depicted or described herein. In some embodiments, the procedures, the processes and/or the activities of method 1500 can be performed in the order presented. In other embodiments, the procedures, the processes, and/or the activities of method 1500 can be performed in any other suitable order. In still other embodiments, one or more of the procedures, the processes, and/or the activities of method 1500 can be combined or skipped. In some embodiments, method 1500 can be implemented by computer system 100 (FIG. 1).

The available categories can be displayed on a screen (block 1504). This listing can follow the format presented in FIG. 10, with a scrollable list of categories being presented in a first display area. Returning to FIG. 15, the available selections are displayed on a screen (block 1504). This displaying can follow the format presented in FIG. 10, with a list of available selections being presented in a second display area. Returning to FIG. 15, input can be received (block 1506). This can occur in a variety of different manners. For example, a user can indicate a selection by pressing a switch on a remote control or video game controller. When the user selects a category, the category is moved to a home position (block 1508). The sub-categories corresponding to the category are displayed (block 1510). Again, these listings can follow a format such as that set forth in FIG. 10 or other FIGs. For example, the sub-categories can be listed in the first display area next to the home position. Returning to FIG. 15, new selections are then displayed (block 1512). In an embodiment using the screen set forth in FIG. 10, the selections can be displayed in the second display area of the screen.

The sequence of the blocks in FIG. 15 can be re-arranged. For example, blocks 1502 and 1504 can be reversed or performed simultaneously with each other. As another example, blocks 1510 and 1512 can be reversed or performed simultaneously with each other. Other variations are also possible.

Figure 16:
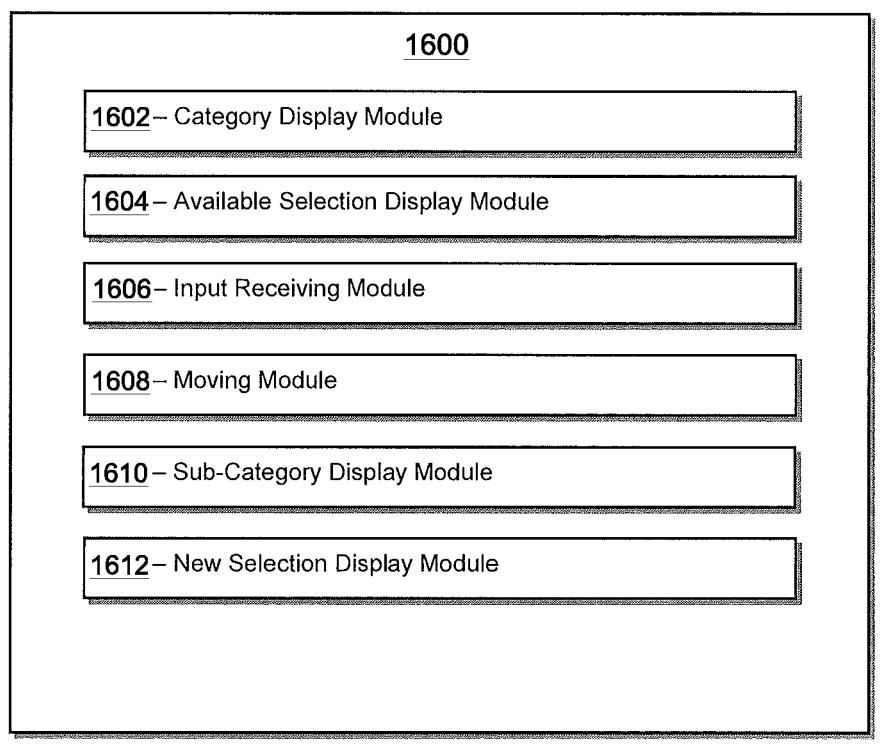
FIG. 16 illustrates a block diagram of a system for navigating a menu according an embodiment.

Turning ahead in the figures, FIG. 16 illustrates a block diagram of a system 1600 for navigating a menu according an embodiment. System 1600 is merely exemplary and is not limited to the embodiments presented herein. System 1600 can be employed in many different embodiments or examples not specifically depicted or described herein. In some embodiments, certain elements or modules of database system 1600 can perform various procedures, processes, and/or acts. In other embodiments, the procedures, processes, and/or acts can be performed by other suitable elements or modules.

In a number of embodiments, system 1600 can include a category display module 1604. In certain embodiments, display module 1604 can perform block 1504 (FIG. 15) of displaying available categories.

In a number of embodiments, system 1600 can include an available selection display module 1604. In certain embodiments, display module 1604 can perform block 1504 (FIG. 15) of displaying available selections.

In a number of embodiments, system 1600 can include an input receiving module 1606. In certain embodiments, input receiving module 1606 can perform block 1506 (FIG. 15) of receiving an input.

In a number of embodiments, system 1600 can include a moving module 1608. In certain embodiments, moving module 1608 can perform block 1508 (FIG. 15) of moving a chosen category to a certain place on a screen.

In a number of embodiments, system 1600 can include a sub-category display module 1610. In certain embodiments, display module 1610 can perform block 1510 (FIG. 15) of displaying available sub-categories.

In a number of embodiments, system 1600 can include a new selection display module 1612. In certain embodiments, display module 1612 can perform block 1512 (FIG. 15) of displaying a new list of selections.

Figure 17:
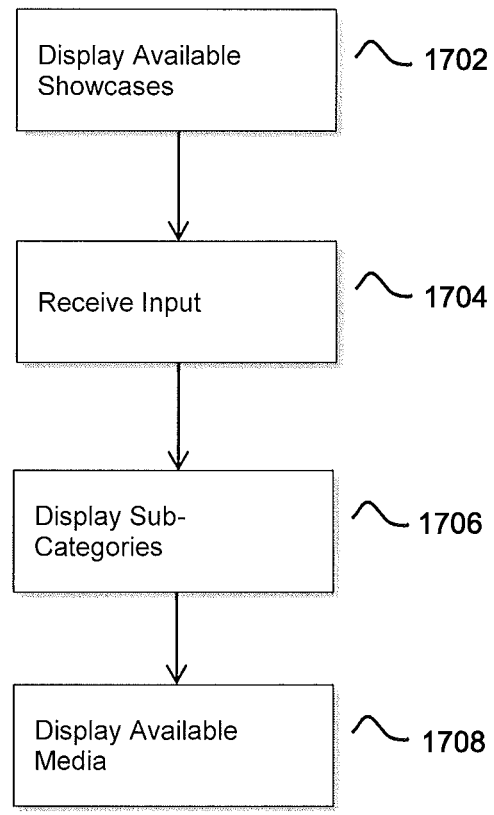
FIG. 17 illustrates a flow chart of a method to navigate a menu using showcases according to an embodiment.

Turning ahead in the figures, FIG. 17, a flow chart illustrating a method 1700 to navigate a menu according to an embodiment is presented. Method 1700 is merely exemplary and is not limited to the embodiments presented herein. Method 1700 can be employed in many different embodiments or examples not specifically depicted or described herein. In some embodiments, the procedures, the processes and/or the activities of method 1700 can be performed in the order presented. In other embodiments, the procedures, the processes, and/or the activities of method 1700 can be performed in any other suitable order. In still other embodiments, one or more of the procedures, the processes, and/or the activities of method 1700 can be combined or skipped. In some embodiments, method 1700 can be implemented by computer system 170 (FIG. 1).

The available showcases can be displayed on a screen (block 1702). This listing can follow the format presented in FIG. 13, with a scrollable list of showcase being presented in a second display area. When performing block 1702, the portion of the screen typically showing the first display area can be blank. Returning to FIG. 17, user input is received (block 1704). This can occur in a variety of different manners. For example, a user can indicate a selection by pressing a switch on a remote control or video game controller. The received input can indicate a selected showcase. Returning to FIG. 17, sub-categories are displayed (block 1706). This displaying can follow the format presented in FIG. 14, with a list of available sub-categories being presented in a first display area. Returning to FIG. 17, available media is displayed (block 1708). This displaying can follow the format presented in FIG. 14, with a list of available media being presented in a second display area. Thereafter, the steps presented with respect to FIG. 15 can be performed.

The sequence of the blocks in FIG. 17 can be re-arranged. For example, blocks 1706 and 1708 can be reversed or performed simultaneously with each other. Other variations are also possible.

Figure 18:
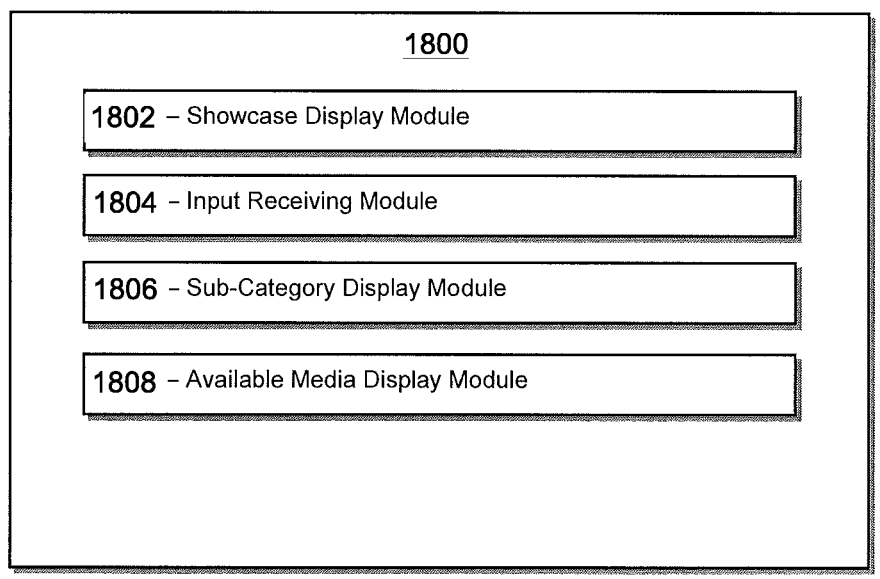
FIG. 18 illustrates a block diagram of a system for navigating a menu using showcases according an embodiment.

Turning ahead in the figures, FIG. 18 illustrates a block diagram of a system 1800 for navigating a menu according an embodiment. System 1800 is merely exemplary and is not limited to the embodiments presented herein. System 1800 can be employed in many different embodiments or examples not specifically depicted or described herein. In some embodiments, certain elements or modules of database system 1800 can perform various procedures, processes, and/or acts. In other embodiments, the procedures, processes, and/or acts can be performed by other suitable elements or modules.

In a number of embodiments, system 1800 can include a showcase display module 1802. In certain embodiments, showcase display module 1802 can perform block 1702 (FIG. 17) of displaying available showcases categories.

In a number of embodiments, system 1800 can include an input receiving module 1804. In certain embodiments, input receiving module 1804 can perform block 1704 (FIG. 17) of receiving user input.

In a number of embodiments, system 1800 can include sub-category display module 1806. In certain embodiments, sub-category display module 1806 can perform block 1706 (FIG. 17) of displaying sub-categories.

In a number of embodiments, system 1800 can include an available media display module 1808. In certain embodiments, available media display module 1808 can perform block 1708 (FIG. 17) of displaying available media.

Via a ribbon panel, users can navigate across movie/TV genre panels. From there, the user can select sub-genre panels, to filter and find their desired content quickly and easily. The navigation filters from genre to sub-genre to content choices in a seamless manner, allowing the user to remain on a specific screen and allow the user to navigate without the need for excessive movement.

The motion language can consist of clicking on a genre panel, and having the selected genre panel move to the left, while the other genre panels fade away. Related sub-genre panels then fade-up, available for selection, based on the user's choice. These sub-genre panels filter down to a narrow sub-set of results, in line with the user's selections. The visual language includes an iconic image, treated in a desaturated image style that is relevant to the genre or sub-genre category.

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-18 can be modified, and that the foregoing discussion of certain of these embodiments does not necessarily represent a complete description of all possible embodiments. For example, one or more of the procedures, processes, or activities of FIGS. 1-2 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:

receiving a menu selection of a menu choice of one or more menu choices, wherein:

the menu selection of the menu choice is:

configured to initiate a display of a new media file; and made via a graphical user interface (GUI) of an electronic device of a user;

the electronic device is at least internet-capable for streaming or downloading via the internet; and after being selected, the menu choice is visually differentiated from other menu choices of the one or more menu choices;

facilitating displaying, on the GUI of the electronic device of the user:

one or more boxes below the one or more menu choices, each respective box of the one or more boxes:

representing a respective media file of a selection of media files; and being selectable via the GUI of the electronic device of the user;

one or more panels below the one or more boxes, a first panel of the one or more panels comprising a start selector and a total number of the media files in the selection of the media files;

receiving a start selection of the start selector from the GUI of the electronic device of the user;

in response to receiving the start selection of the start selector, facilitating displaying, in a second panel of the one or more panels, a list of categories of the media files, each category of the list of categories being selectable via the GUI of the electronic device of the user;

receiving, from the GUI of the electronic device of the user, a first category selection of a first category of the list of categories displayed in the second panel;

in response to receiving the first category selection, facilitating displaying, on the GUI of the electronic device of the user, one or more first category criteria of the first category, the one or more first category criteria being selectable on the GUI;

receiving a first criterion selection of a first criterion of the one or more first category criteria from the GUI of the electronic device of the user;

querying a media file database comprising the media files to determine one or more first media files of the selection of the media files having at least the first criterion, as selected;

facilitating displaying:

in the second panel of the one or more panels:

the first category, as selected, near a top of the second panel;

a number of the media files of the selection of the media files having the at least the first criterion, as selected; and the first criterion, as selected, in a position of the first category when the first category was displayed in the list of categories in the second panel;

a first line segment extending from a bottom of the first panel to the first criterion, as selected and displayed, in the second panel;

at least one updated box of the one or more boxes, wherein:

the at least one updated box represents a matching media file characterized by the at least the first criterion, as selected; and the at least one updated box is displayed in a position for a non-matching media file not having the at least the first criterion, as selected;

in a third panel of the one or more panels, the list of categories of the media files;

receiving, from the GUI of the electronic device of the user, a second category selection of a second category of the list of categories displayed in the second panel, the second category being different than the first category;

in response to receiving the second category selection, facilitating displaying, on the GUI of the electronic device of the user, one or more second category criteria of the second category, the one or more second category criteria being selectable on the GUI and being different than the one or more first category criteria;

receiving a second criterion selection of a second criterion of the one or more second category criteria from the GUI of the electronic device of the user;

querying the media file database to determine one or more second media files of the selection of the media files having at least the first criterion, as selected, and the second criterion, as selected;

facilitating displaying:

in the third panel of the one or more panels:

the second category, as selected, near a top of the third panel;

a number of the media files of the selection of the media files having the at least the first criterion, as selected, and the second criterion, as selected; and the second criterion, as selected, in a position of the second category when the second category was in the list of categories in the third panel;

a second line segment extending from the first criterion, as selected and displayed in the second panel, to the second criterion, as selected and displayed in the third panel;

at least one new box of the one or more boxes, wherein:

the at least one new box represents a new media file having the at least the first criterion, as selected, and the second criterion, as selected; and the at least one updated box is displayed in a position for a second non-matching media file having the at least the first criterion, as selected, but not the second criterion, as selected;

in a fourth panel of the one or more panels, the list of categories of the media files;

receiving a movement of a navigation element to the at least one new box of the one or more boxes;

in response to receiving the movement of the navigation element, facilitating displaying, on the GUI of the electronic device of the user, a detail box comprising production information of the new media file, a rating of the new media file, user generated information for the new media file, and availability information of the new media file;

receiving a playback selection for the at least one new box of the one or more boxes; and in response to receiving the playback selection, facilitating playback of the new media file on the GUI of the electronic device of the user.

2. The method of claim 1, wherein:
queryng the media file database to determine the one or more second media files of the selection of the media files having the at least the first criterion, as selected, and the second criterion, as selected comprises:
   using the media file database and the second category criterion to analyze a first filtered list of the selection of the media files; and
   when the first filtered list of the selection of the media files no longer comprises a specific category of the list of categories, removing the specific category from the list of categories, as displayed in the fourth panel of the one or more panels.

3. The method of claim 1 wherein facilitating the playback of the new media file comprises:
   beginning a transfer of the new media file to the electronic device of the user; and
   providing instructions to the electronic device of the user, the instructions configured to request playback of the new media file.

4. The method of claim 1 wherein:
   the media file database comprises one or more fields for a plurality of category criteria, each respective category criterion of the plurality of category criteria belonging to a respective category of a plurality of categories.

5. The method of claim 4 wherein:
   the media file database further comprises a bitmap index of the plurality of category criteria and a bitmap index of the list of the plurality of categories.

6. The method of claim 2 further comprising:
   determining a number of categories of the selection of the media files in the first filtered list of the media files; and
   displaying the number of categories of the selection of the media files on the GUI of the electronic device of the user.

7. The method of claim 1, wherein each respective box of the one or more boxes further comprises:
   a graphic associated with each corresponding, respective media file; and
   a stylized title for each corresponding, respective media file separate from the graphic.

8. The method of claim 1 wherein the navigation element is configured to allow scrolling through the one or more menu choices, the one or more boxes, the list of categories of the media files, the one or more first category criteria, and the one or more second category criteria.

9. A system comprising:
one or more processors; and
one or more non-transitory storage devices storing computing instructions configured to run on the one or more processors and perform:
   receiving a menu selection of a menu choice of one or more menu choices, wherein:
      the menu selection of the menu choice is:
         configured to initiate a display of a new media file; and
         made via a graphical user interface (GUI) of an electronic device of a user;
      the electronic device is at least internet-capable for streaming or downloading via the internet; and
      after being selected, the menu choice is visually differentiated from other menu choices of the one or more menu choices;
   facilitating displaying, on the GUI of the electronic device of the user:
      one or more boxes below the one or more menu choices, each respective box of the one or more boxes:
         representing a respective media file of a selection of media files; and
         being selectable via the GUI of the electronic device of the user;
      one or more panels below the one or more boxes, a first panel of the one or more panels comprising a start selector and a total number of the media files in the selection of the media files;
   receiving a start selection of the start selector from the GUI of the electronic device of the user;
   in response to receiving the start selection of the start selector, facilitating displaying, in a second panel of the one or more panels, a list of categories of the media files, each category of the list of categories being selectable via the GUI of the electronic device of the user;
   receiving, from the GUI of the electronic device of the user, a first category selection of a first category of the list of categories displayed in the second panel;
   in response to receiving the first category selection, facilitating displaying, on the GUI of the electronic device of the user, one or more first category criteria of the first category, the one or more first category criteria being selectable on the GUI;
   receiving a first criterion selection of a first criterion of the one or more first category criteria from the GUI of the electronic device of the user;
   querying a media file database comprising the media files to determine one or more first media files of the selection of the media files having at least the first criterion, as selected;
   facilitating displaying:
      in the second panel of the one or more panels:
         the first category, as selected, near a top of the second panel;
         a number of the media files of the selection of the media files having the at least the first criterion, as selected; and
         the first criterion, as selected, in a position of the first category when the first category was in the list of categories in the second panel;
      a first line segment extending from a bottom of the first panel to the first criterion, as selected and displayed, in the second panel;
      at least one updated box of the one or more boxes, wherein:
         the at least one updated box represents a matching media file characterized by the at least the first criterion, as selected; and
         the at least one updated box is displayed in a position for a box of the one or more boxes comprising a non-matching media file not having the at least the first criterion, as selected;
      in a third panel of the one or more panels, the list of categories of the media files;
   receiving, from the GUI of the electronic device of the user, a second category selection of a second category of the list of categories displayed in the second panel, the second category being different than the first category;
   in response to receiving the second category selection, facilitating displaying, on the GUI of the electronic device of the user, one or more second category criteria of the second category, the one or more second category criteria being selectable on the GUI and being different than the one or more first category criteria;
receiving a second criterion selection of a second criterion of the one or more second category criteria from the GUI of the electronic device of the user;
querying the media file database to determine one or more second media files of the selection of the media files having at least the first criterion, as selected, and the second criterion, as selected;
facilitating displaying:
in the third panel of the one or more panels:
the second category, as selected, near a top of the third panel;
a number of the media files of the selection of the media files having the at least the first criterion, as selected, and the second criterion, as selected; and
the second criterion, as selected, in a position of the second category when the second category was in the list of categories in the third panel;
a second line segment extending from the first criterion, as selected and displayed in the second panel, to the second criterion, as selected and displayed in the third panel;
at least one new box of the one or more boxes, wherein:
the at least one new box represents a new media file having the at least the first criterion, as selected, and the second criterion, as selected; and
the at least one updated box is displayed in a position for a second non-matching media file having the at least the first criterion, as selected, but not the second criterion, as selected;
in a fourth panel of the one or more panels, the list of categories of the media files;
receiving a movement of a navigation element to the at least one new box of the one or more boxes;
in response to receiving the movement of the navigation element, facilitating displaying, on the GUI of the electronic device of the user, a detail box comprising production information for the new media file, a rating of the new media file, user generated information of the new media file, and availability information of the new media file;
receiving a playback selection for the at least one new box of the one or more boxes; and
in response to receiving the playback selection, facilitating playback of the new media file on the GUI of the electronic device of the user.

10. The system of claim 9, wherein:
querying the media file database to determine the one or more second media files of the selection of the media files having the at least the first criterion, as selected, and the second criterion, as selected comprises:
using the media file database and the second category criterion to analyze a first filtered list of the selection of the media files; and
when the first filtered list of the selection of the media files no longer comprises a specific category of the list of categories, removing the specific category from the list of categories, as displayed in the fourth panel of the one or more panels.

11. The system of claim 9 wherein facilitating the playback of the new media file comprises:
beginning a transfer of the new media file to the electronic device of the user; and
providing instructions to the electronic device of the user, the instructions configured to request playback of the new media file.

12. The system of claim 9 wherein:
the media file database comprises one or more fields for a plurality of category criteria, each respective category criterion of the plurality of category criteria belonging to a respective category of a plurality of categories.

13. The system of claim 12 wherein:
the media file database further comprises a bitmap index of the plurality of category criteria and a bitmap index of the list of the plurality of categories.

14. The system of claim 10 wherein the computing instructions further comprise:
determining a number of categories of the selection of the media files in the first filtered list of the media files; and
displaying the number of categories of the selection of the media files on the GUI of the electronic device of the user.

15. The system of claim 9 wherein each respective box of the one or more boxes further comprises:
a graphic associated with each corresponding, respective media file; and
a stylized title for each corresponding, respective media file separate from the graphic.

16. The system of claim 1 wherein the
navigation element is configured to allow scrolling through the one or more menu choices, the one or more icons, the list of categories of the media files, the one or more first category criteria, and the one or more second category criteria.

17. The method of claim 1, wherein:
the list of categories of media files comprises at least mood, plot, period, and place;
when the first category selection of the first category comprises mood, then the one or more first category criteria comprises two or more mood criteria that each describe how any media file of the selection of the media files having the two or more mood criteria is intended to make a viewer feel;
when the first category selection of the first category comprises plot, then the one or more first criteria comprises two or more plot criteria that each describe a type of movie plot;
when the first category selection of the first category comprises period, then the first category criteria comprises two or more time periods; and
when the first category selection of the first category comprises place, then the one or more category criteria comprises two or more place criteria that each describe where any media file of the selection of the media files having the two or more place criteria takes place.

18. The system of claim 9, wherein:
the list of categories of media files comprises at least mood, plot, period, and place;
when the first category selection of the first category comprises mood, then the one or more first category criteria comprises two or more mood criteria that each describe how any media file of the selection of the media files having the two or more mood criteria is intended to make a viewer feel;

when the first category selection of the first category comprises plot, then the one or more first criteria comprises two or more plot criteria that each describe a type of movie plot;

when the first category selection of the first category comprises period, then the first category criteria comprises two or more time periods; and when the first category selection of the first category comprises place, then the one or more category criteria comprises two or more place criteria that each describe where any media file of the selection of the media files having the two or more place criteria takes place.

19. The method of claim 1, wherein the user opens a connection to a streaming service.

20. The system of claim 9, wherein the user opens a connection to a streaming service.

* * * * *